US012685937B2

(12) United States Patent
Casado et al.

(10) Patent No.: US 12,685,937 B2
(45) Date of Patent: **\*Jul. 21, 2026**

(54) CONTROLLING A USER INTERFACE OF A COMPUTER DEVICE

(71) Applicant: KING.COM LIMITED, St. Julians (MT)

(72) Inventors: Carlos Casado, Barcelona (ES); Carlos Lidon, Barcelona (ES)

(73) Assignee: KING.COM LIMITED, St. Julian's (MT)

( * ) Notice: Subject to any disclaimer, the term of this patent is extended or adjusted under 35 U.S.C. 154(b) by 352 days.

This patent is subject to a terminal disclaimer.

(21) Appl. No.: 18/473,611

(22) Filed: Sep. 25, 2023

(65) Prior Publication Data

US 2024/0009567 A1     Jan. 11, 2024

Related U.S. Application Data

(63) Continuation of application No. 16/397,318, filed on Apr. 29, 2019, now Pat. No. 11,801,445.

(51) Int. Cl.
*A63F 13/537*          (2014.01)
(52) U.S. Cl.
CPC .................................. *A63F 13/537* (2014.09)
(58) Field of Classification Search
CPC ........................... A63F 13/5375; A63F 13/537
See application file for complete search history.

(56) References Cited

U.S. PATENT DOCUMENTS

| | | | | |
|---|---|---|---|---|
| 8,449,361 B2 * | 5/2013 | Laycock | ................. | A63F 13/65 |
| | | | | 463/16 |
| 2002/0160823 A1 | 10/2002 | Watabe et al. | | |
| 2005/0043092 A1 * | 2/2005 | Gauselmann | ....... | G07F 17/3262 |
| | | | | 463/36 |
| 2007/0054718 A1 * | 3/2007 | Del Prado | ............. | A63F 13/792 |
| | | | | 463/1 |
| 2007/0060252 A1 * | 3/2007 | Taylor | ..................... | G07F 17/32 |
| | | | | 463/16 |
| 2007/0060269 A1 * | 3/2007 | Ruppert | .............. | G07F 17/3262 |
| | | | | 463/16 |
| 2007/0167210 A1 | 7/2007 | Kelly et al. | | |
| 2007/0225061 A1 * | 9/2007 | Naobayashi | ............ | G07F 17/32 |
| | | | | 463/20 |
| 2008/0242398 A1 * | 10/2008 | Harris | ..................... | G07F 17/32 |
| | | | | 463/43 |
| 2009/0270155 A1 * | 10/2009 | Glass | ..................... | G07F 17/32 |
| | | | | 463/43 |
| 2012/0046099 A1 | 2/2012 | Mraovic | | |

(Continued)

*Primary Examiner* — Steve Rowland
(74) *Attorney, Agent, or Firm* — Holzer Patel Drennan

(57)          ABSTRACT

A computer device has a user interface configured to present to a user a selected one of a plurality of game levels. Each game level is associated with a set of rules which control the display of game outcomes. A pre-level screen is displayed to the user comprising selectable objects, each of which is associated with a set of rule modifications. The user selects one of the selectable objects. The set of rules associated with the game level is modified according to the rule modifications associated with the selected selectable object. The level is presented to the user for interaction according to the modified set of rules. A corresponding method and computer program is provided.

22 Claims, 26 Drawing Sheets

(56) References Cited

U.S. PATENT DOCUMENTS

| 2013/0060362 A1* | 3/2013 | Murphy ................ A63F 13/828 |
| | | 700/93 |
| 2013/0331162 A1 | 12/2013 | Krivicich et al. |
| 2014/0080556 A1 | 3/2014 | Knutsson |
| 2014/0171166 A1 | 6/2014 | Merari |
| 2015/0045106 A1* | 2/2015 | You ..................... G07F 17/3267 |
| | | 463/20 |
| 2015/0258444 A1 | 9/2015 | Norden |
| 2015/0265910 A1 | 9/2015 | Campbell et al. |
| 2016/0098161 A1 | 4/2016 | Baack et al. |
| 2016/0253876 A1* | 9/2016 | Kitamura ........... G07F 17/3267 |
| | | 463/20 |

* cited by examiner

200

218

814

1502

1600

1602

1604

1602

1606

1700

1708

1702

1704

1706

CONTROLLING A USER INTERFACE OF A COMPUTER DEVICE

CROSS-REFERENCE TO RELATED APPLICATIONS

This is a continuation of U.S. application Ser. No. 16/397,318, filed Apr. 29, 2019, the entire contents of which being fully incorporated herein by reference.

TECHNICAL FIELD OF INVENTION

The present disclosure relates to controlling a user interface responsive to user engagement with displayed elements on the interface of a computer device.

BACKGROUND OF THE INVENTION

There are multiple technical challenges facing the designer of computer-implemented games to create a fun and compelling game. One particular challenge is that of engagement.

Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment.

One technical area where there are particular challenges in controlling the display of a computer device is in the design of computer-implemented games. Not only is there a requirement to create fun and compelling games, these games need to be delivered to a player in a seamless and engaging fashion, while adhering to complex game rules.

Games have been developed in which a user engages game elements in a board to achieve certain objectives, by causing game elements to be removed in a strategic fashion.

A 'clicker game' is a type of casual puzzle game where the player is required to find patterns on a seemingly chaotic board. The player then has to match two or more of the same type of game element on the game board and those matched elements will then be removed from the board. The player matches adjacent game elements of the same type by selecting one or more of the game elements in the group of matching elements.

A 'switcher game' is also a type of casual puzzle game where the player is required to find patterns on a seemingly chaotic board. In a switcher game, the player switches the locations of two adjacent game elements on the game board so that one or both of them create a chain of at least three adjacent game elements of the same type. Those matched game elements will then be removed from the gameboard. The gameboard is then repopulated with game objects.

A 'bubble shooter game' is also a type of casual puzzle game where the player is required to find patterns on a seemingly chaotic board. The game provides a static bubble graph in the game board on a display of a computer device. The game objective is to remove bubbles to clear the way through the graph, and to do this the player operates a player object launcher that can shoot player objects into the game board. When the launched player object reaches an object in the player graph, it "sticks" to it. If it hits a game object of the same type as the player object, which already has another game object of the same characteristic adjacent to it, a 3-match condition is created and the three game objects disappear from the game board. A match could have more than three game objects in it. A match can be associated with a certain score.

A challenge that faces manufacturers of such games is that of developments time to devise even more game levels to keep a player engaged.

SUMMARY OF THE INVENTION

In order to increase involvement in such games, the present inventors have devised an improved computer device having a user interface which is controlled to display to a user. In the following embodiments, the device is configured to provide a computer-implemented game of a matching type (clicker, switcher, or linker), in which the user can modify the game mechanics of the level he is about to play, but without altering the initial layout and tile attributes of the level. Different modes of the same level can be played, thereby increasing user engagement without increasing development time. Before starting a level, a user is able to decide which mode of play he would like to participate in. The mode of play determines the mechanics of the game. This allows the user to strategically choose the mode of play for each level to best suit his strengths and the layout and goals of the level. The user may choose to re-play the same level in a different mode, such that the level data remains constant but the rules for that attempt of the level are modified.

According to a first aspect disclosed herein, there is provided a computer device having: a user interface configured to present to a user a selected one of a plurality of game levels, each game level comprising a plurality of tiles in a tile layout, each tile having a game attribute defined by the game level, and at least some of the tiles having displayed thereon user actuatable game elements with which the user can interact, the user interface being configured to detect user input when a user engages with at least one of said user actuatable game elements; wherein each of the plurality of game levels is associated with a set of rules which control the display of game outcomes on the user interface; and a processor configured to present to a user on the user interface prior to the selected game level a pre-level screen which comprises a plurality of selectable objects; detect selection of one of the selectable objects; access a set of rule modifications associated with the selected object for modifying the set of rules associated with that game level, without modifying the layout of tiles or game attributes of the tiles; and present the game level to the user for interaction according to the modified set of rules.

In an example, the user actuatable game elements have different characteristics, and, when a match game condition is detected, matching game elements are removed and replaced by a random refill procedure.

In an example, the set of rules defines a number of game moves within which a game objective for the level is to be attained to be displayed as a game outcome.

In that example, the set of rule modifications may define a period of time, corresponding to the number of game moves, within which the objective is to be attained to be displayed as the game outcome.

In an example, the set of rule modifications provides a swap object, which when activated swaps the moves remaining for time remaining whilst in a game play display.

In an example, the set of rules presents to the user a power bar which displays as a game outcome a charge level based on consecutive matches.

In that example, the set of rule modifications may cause the power bar to be charged only with consecutive matches of the same type, the power bar becoming full after a predefined number of consecutive matches of the same type.

In an example, when the power bar is full it is rendered as selectable by a user, and when selected, any game elements of a common type are removed from the game board.

In an example, the power bar is emptied after reaching a charge level after one or more matches of the same type prior to reaching said predefined number if a next match is of a different type of game elements.

In an example, the set of rule modifications causes a reserve user actuatable game element to be displayed to a user, said reserve game element being located outside the layout of tiles, wherein the user can select one of the user actuatable game elements on the layout and swap said selected user actuatable game element with the reserve game element to provide as a game outcome an altered gameboard.

In an example, the game level presented to the user according to the set of modified rules presents a user selectable shuffle option which rearranges the positions of the at least some user actuatable game elements on the layout to provide an altered game element arrangement as a game outcome.

In that example, the computer device may be configured to enable the shuffle option for selection only every n game moves, wherein the set of rules defines a number of game moves within which an objective is to be attained.

In an example, the layout is an m by n array of rows and columns and the set of rules controls the operation of a special user actuatable game element, such that when the special game element is part of a match game condition, a game outcome is such that a row or column of game elements is removed from the board.

In that example, the set of rule modifications may control operation of the special user actuatable game element, such that, when the special user actuatable game element is part of a match game condition, it causes multiple rows or columns to be removed, and at least one column or row respectively.

In an example, the layout is an m by n array, and game elements are switchable in their row or column, a match game condition being detected when adjacent game elements arranged in rows or columns are of the same type.

In that example, the set of rule modifications may enable diagonal switching of game elements of the gameboard.

In an example, the layout is an n by m array.

In an example, m=n.

In an example, the game attributes of the tiles comprise user actuatable game elements, blockers, and pre-designated special game elements.

In different embodiments, the set of rules define either: a switcher mechanic; a clicker mechanic; or a linker mechanic.

According to a second aspect disclosed herein, there is provided a method comprising: presenting to a user a selected one of a plurality of game levels, each game level comprising a plurality of tiles in a tile layout, each tile having a game attribute defined by the game level, and at least some of the tiles having displayed thereon user actuatable game elements with which the user can interact, wherein each of the plurality of game levels is associated with a set of rules which control the display of game outcomes; presenting to the user, prior to the selected game level, a pre-level screen which comprises a plurality of selectable objects; detecting selection of one of the selectable objects; accessing a set of rule modifications associated with the selected object for modifying the set of rules associated with that game level, without modifying the layout of tiles or game attributes of the tiles; and presenting the game level to the user for interaction according to the modified set of rules.

The selectable objects may, by way of non-limiting example, be buttons or cards. Other selectable objects may be envisaged.

In an example, the method comprises presenting the game levels on a user interface, the user interface being configured to detect user input when a user engages with at least one of said user actuatable game elements.

According to a third aspect disclosed herein, there is provided a computer program product comprising transitory or non-transitory computer-executable code configured so as when executed by one or more processing units to perform the steps of the method according to the second aspect. Non transitory code may be stored on a computer readable medium.

For a better understanding of the present invention and to show how the same may be carried into effect, reference will now be made by way of example to the accompanying drawings.

DETAILED DESCRIPTION OF THE INVENTION

The present disclosure describes a technique for allowing users of a game to modify the rules of the game level they are playing. The player is able to select a type of game play from a pre-determined list of game play types, also referred to as game mode options, each type corresponding to different game rules. The base game mechanic may be a 'clicker', 'switcher', or 'bubble shooter', where the user can cause game elements of a matching type to be removed from the board by strategic selection. Different game rule modifications may be selected by the user to be applied in conjunction with the base game mechanic.

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing from the scope of the present invention.

The techniques described herein can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another possible infrastructure is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

In implementations where some or all elements of gameplay are executed on a remote server, users may be able to share their gaming experiences with other users. They may, for example, be able to share the scores they have achieved in a level with other players, which may be used to generate a leader board. Users may be able to choose which other users to share their scores with, for example their friends on a social media platform such as Facebook. This gives a social aspect to the game.

Figure 1:
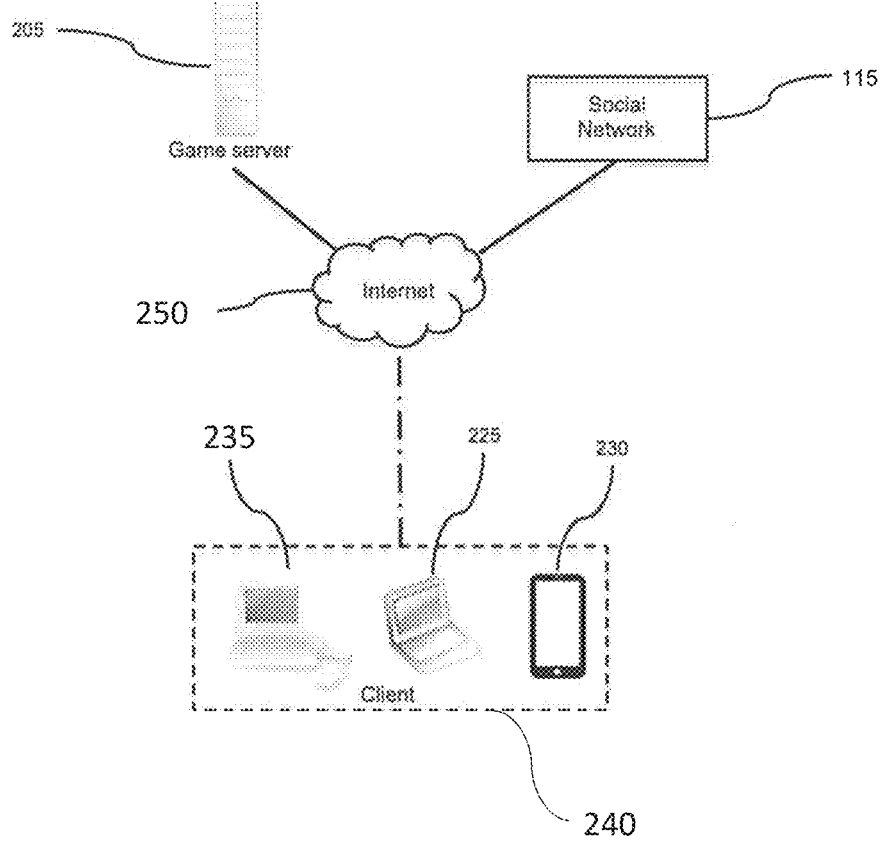
FIG. 1 is a schematic block diagram illustrating an environment for playing a game.

FIG. 1 portrays an exemplary overall environment in which the present invention can be utilized. A virtual game is stored on for instance a game server 205. The virtual game is to be played on a client device 240, such as a computer 235, 225 or a smartphone or other handheld device 230. The client device 240 can also be a kiosk, arcade gaming station, smart TV or other device with computing capabilities, input devices and a screen that can present the game to a user. The client device communicates with the game server 205 and a social network server 115, for instance through the Internet 250 or other network. It should be understood that the social network server 215 and the game server 205 do not have to be located in different places, they could be on the same server or on a plurality of servers located in different locations. People skilled in the art will understand that other devices than the exemplary ones listed can also be used without departing from the scope of the invention.

The game can be implemented allowing a user to interact with it in different ways depending on the capabilities of the client device 240 which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Figure 2:
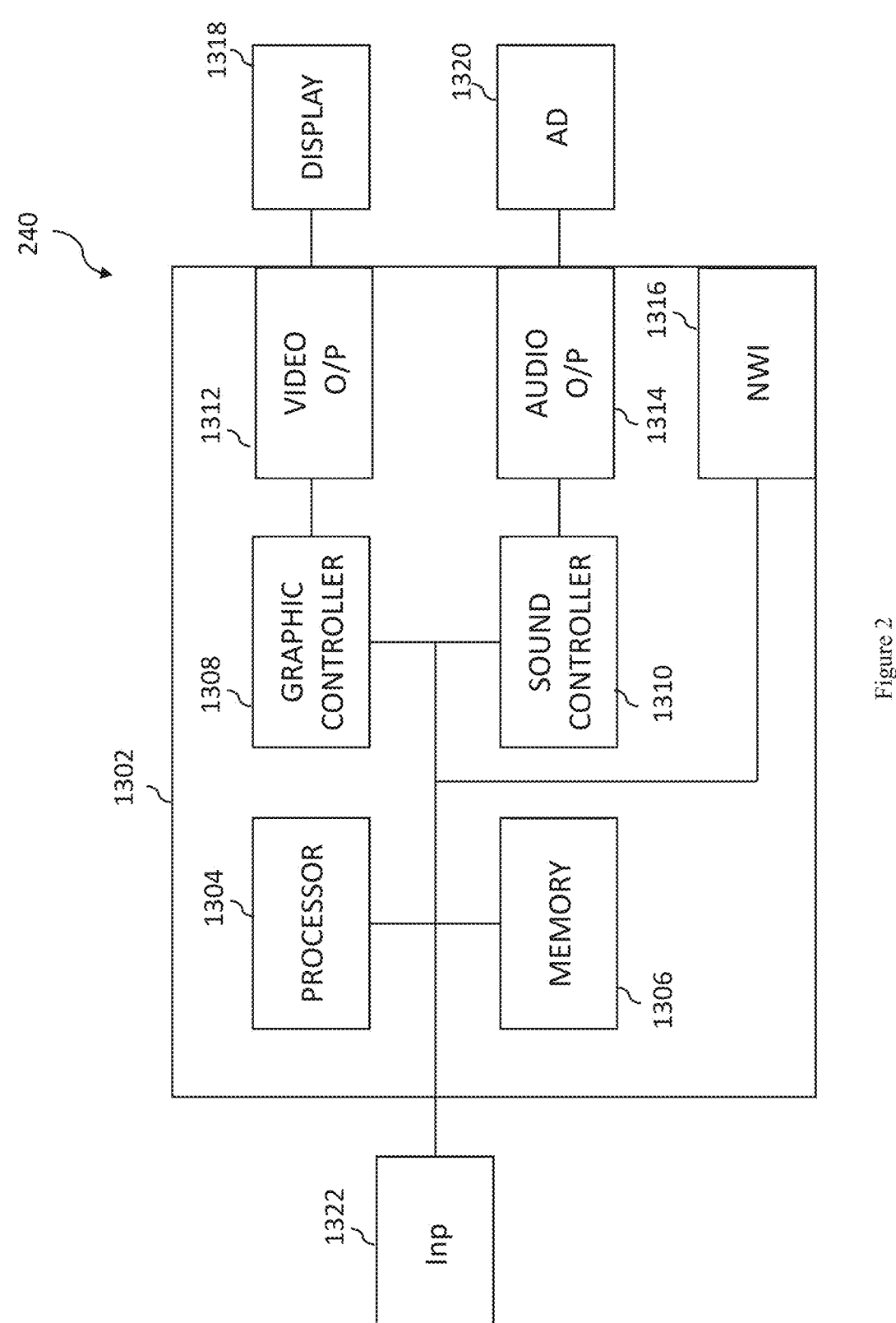
FIG. 2 is a schematic block diagram of a user device.

A schematic view of the user or computing device 240 according to an embodiment is shown in FIG. 2. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional blocks may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet 250 or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of a keyboard, mouse, touch screen, joystick or game controller. It should be appreciated that the display 1318 may in some embodiments also provide the input device 1322, for example, by way of an integrated touch screen.

The blocks of the controller 1302 are configured to communicate with each other via an interconnect such as a bus or any other suitable interconnect and/or by point to point communication.

It should be appreciated that, in some embodiments, the controller 1302 may be implemented by one or more circuits, at least in part.

It should be appreciated that embodiments may be deployed in different system architectures. For example, the computer game may be implemented as a computer game that is stored in the memory 1306 of the user device 240. However, when online, the server 205 may handle some elements of the game in some embodiments. By way of example only, a Java game applet may be provided to the user device 240 and the locally running Java applet will generate, for example, the graphics, sounds, and user interaction for the game play on the user device 240. Java applet can have sufficient information to allow offline play when the user device is no longer in communication with the game server 205, e.g. if connectivity is lost.

In some embodiments, the game may be implemented as a computer program that is stored in a memory system, for example the server 205, and which runs on the processor of the game server. Data streams or updates are supplied to the user device 240 to allow the user device 240 to render and display graphics and sounds in a browser of the user device 240.

Figure 3:
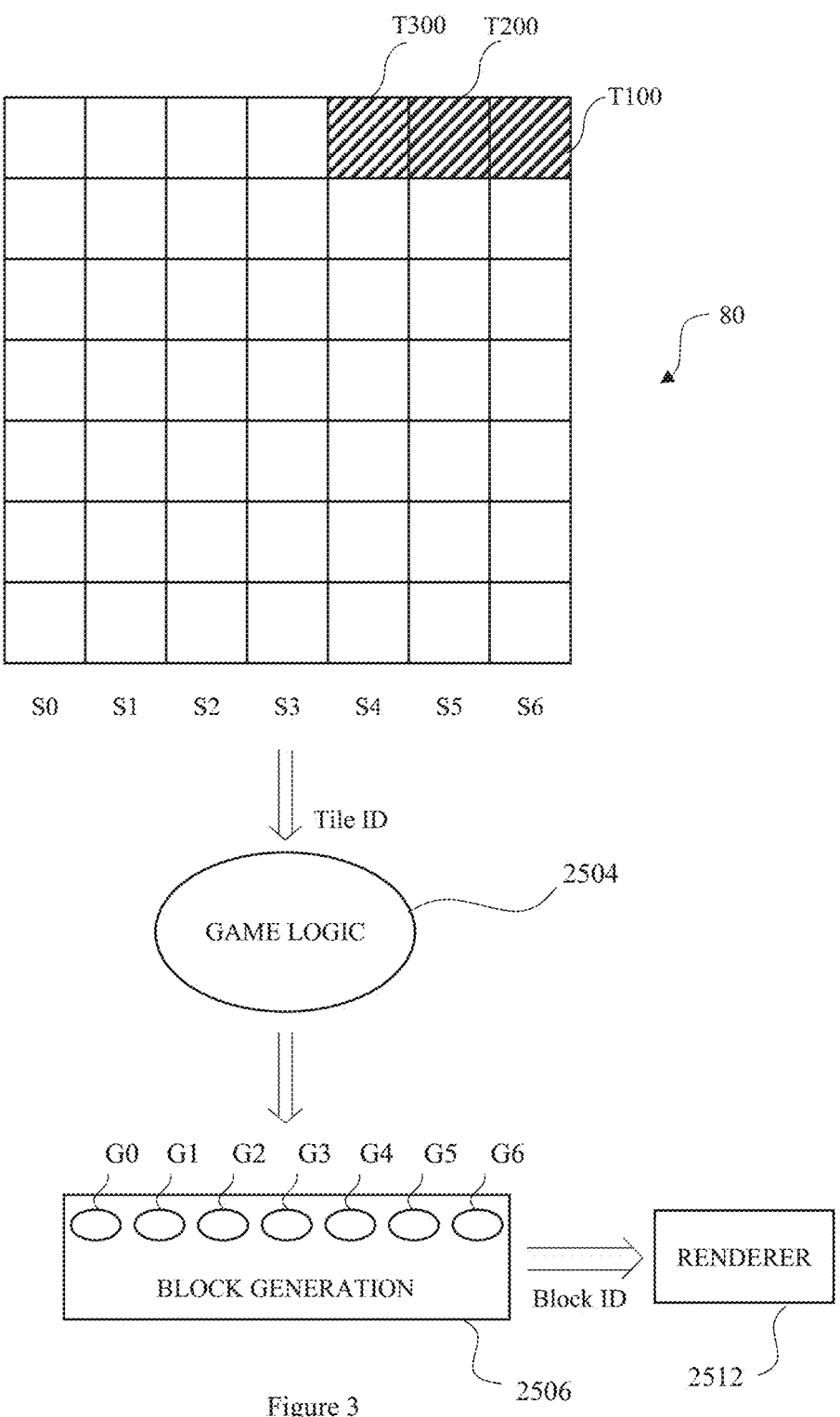
FIG. 3 is a schematic block diagram illustrating a refill process.

FIG. 3 is a highly schematic block diagram illustrating how gameboards are rendered visible to the user through a random refill process. The random refill process is pseudo-random. Each game level has an initial gameboard which is a layout of tiles, each tile having a tile attribute in the initial layout. FIG. 3 shows a tile layout in the form of a grid 80. This tile grid 80 shows an array of tiles arranged in rows and columns. In order to render a game board on a display, each tile is associated with a block to be rendered at that tile location. The nature of the block is determined by the tile attribute. The grid 80 is organised in sets S0 to S6. In this embodiment, each set represents a column of tiles in the array. However, sets may be organised in any appropriate manner. For example, they could be organised in rows or grids of tiles.

Shown in the tile grid 80 are three tiles T100, T200 and T300 which represent tiles where blocks may need to be spawned in play. Replacement blocks are spawned in tiles that have an attribute associating them with playable (user interactable) blocks. A new block is spawned into effect at an entry point of the set. For convenience, the endmost tile (in this case T100) can be considered the entry point for S6. However, any entry point for a set can be defined, and the precise entry point may depend on the orientation or shape of the set. Blocks are spawned into sets at their respective entry points. If the tile below the entry point is vacant, the spawned block is moved down to that tile and then a further block is spawned above it at the entry point. Note that sets may be of different configurations and spawned blocks may be moved to vacant tiles according to different physics.

The game includes block generation logic 2506 which comprises a plurality of deterministic game element generating algorithms labelled G0 to G6. Each set is associated with a respective game element generating algorithm which spawns the new game element in a deterministic manner for its associated set. Game logic 2504 receives a tile identifier indicating a tile into which a block is to be spawned. That is, the tile identifier indicates the set in which the tile belongs, and enables the entry point of the set to be indicated. This tile identifier enables the appropriate algorithm to be activated, and a block identifier is generated by that algorithm to a renderer 2512 which controls a display 1318 on which the game board is presented to cause that block to be inserted at the entry point. Within each set the process may be entirely deterministic. That is, blocks are provided in a predetermined sequence into the set, and moved through the set in a predetermined way. That sequence may be the same for all sets, or each set may have a different sequence. Alternatively, the blocks may be spawned in a random sequence. Randomly spawned blocks will still move through the set in a predetermined way, as dictated by the game physics.

Each generator G0 to G6 can be controlled with a respective seed which then causes a pseudo-random sequence of blocks to be generated based on that seed.

Figure 4:
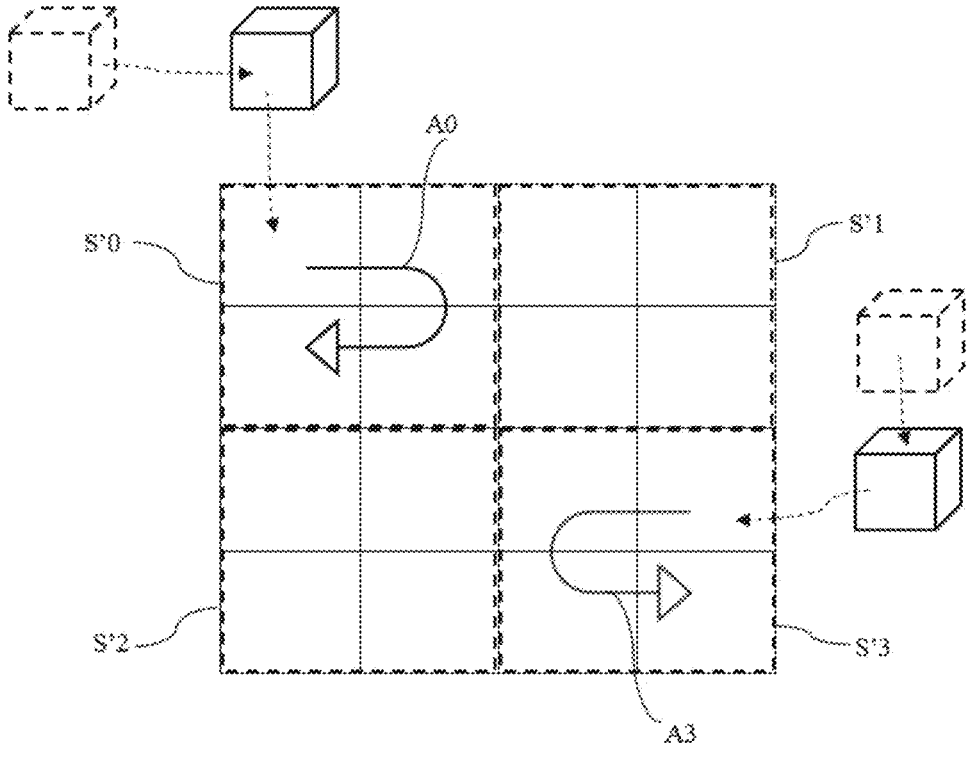
FIG. 4 is a schematic block diagram illustrating sets in a grid.

As mentioned, sets may take any form. FIG. 4 is a schematic diagram showing sets having a different configuration than rows and columns, as in FIG. 3. FIG. 4 shows 16 tiles of a grid, organised into four sets S'0, S'1, S'2 and S'3. Each set comprises four tiles arranged in a grid. The arrows A0, A3, denote the physics within each group. In the set S'0, the top left-hand tile is the entry point of the set. New blocks are spawned here. If when the new block is spawned the tile immediately to the right of it is vacant, the spawned block will move into that tile, and a new block will be spawned into the entry point. Blocks are shown three-dimensionally to indicate that they are different from tiles. Thus, in the set S'0 one can consider a clockwise physics. In set S'3, the arrow A3 moves in an anticlockwise direction denoting an anti-clockwise refill physics. Any refill physics is possible. Note that it is not necessary that the tile into which a spawned block moves after spawning at the entry point tile is adjacently the entry point tile. It could be diagonally away from it or in some other location within the set.

The gameboard 100 used in gameplay is defined by the tile grid 80. A tile is a location which may support a block or have another quality e.g. a hole or blocker. Each tile has its own unique name associated with it. Data about the game elements occupying each tile of the grid are stored in association with the name, or ID, of the tile. This data may be stored in, for example, a tile database. When blocks are removed from the tile grid 80, tile refill occurs and the blocks located at the tiles affected by the refill process change. The data stored in the tile database is updated to represent the locations of elements on the grid 80 after refill.

Holes in the grid show a background and are not valid game board areas. That is, there are no tiles at the locations of the holes. Alternatively, there may be tiles at the locations of the holes in the grid 80, but the attribute of these tiles may be holes, and their attribute remains unchanged through game play. Blocks cannot occupy holes in the gameboard, but, in some embodiments, blocks can fall through them. The shape of the grid may vary.

Figure 5:
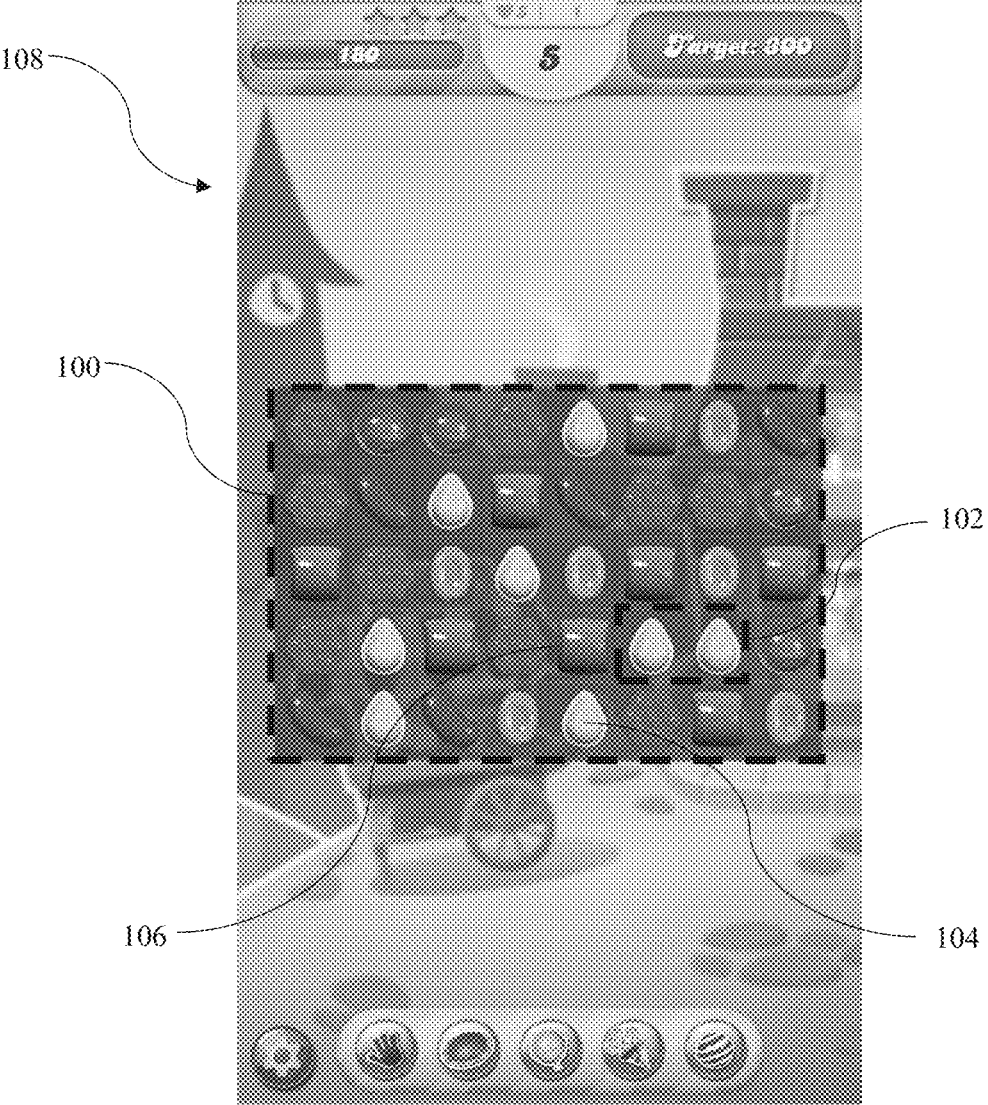
FIG. 5 shows a game play display of a switcher mechanic game.

The following describes an implementation using a 'switcher' mechanic where groups of 3 or more matching objects (referred to in this document as blocks or game elements) are created when a user switches two adjacent blocks and automatically removed. FIG. 5 shows an example of a game play display 108 of a switcher game. A gameboard 100 corresponding to grid is filled with blocks or objects of different shapes and colours. There is a pair of matching adjacent pear drops 102. The user can select the square element 106 and pear drop element 104 in order to switch their respective tile locations on the gameboard 100. This then creates a group of 3 matching adjacent pear drops which are subsequently removed from the gameboard 100.

After the matching adjacent pear drops are removed, the tiles in which they were located are rendered empty. The blocks occupying the tiles above the now empty tiles fall downwards to fill the empty tiles as determined by the game physics. New blocks are spawned at the tile locations at the top of these three columns, corresponding to the entry points of the sets, so that refillable tiles on the gameboard 100 are filled.

Whether the colour and/or shape characteristics of adjacent blocks match is determined by a match check. This check may be carried out for the whole gameboard 100 where there are blocks. All blocks on the game board are match checked against the blocks immediately adjacent to them. Alternatively, only some blocks on the gameboard are match checked. The blocks to be match checked may be determined by the location of user interaction with the gameboard, and/or the location of recent tile activity such as block removal or block refill. When multiple blocks are detected to have matching characteristics, a group of blocks is formed such that even blocks which are not directly adjacent to each other are included in the same group as long as they are connected in an adjacent manner via other blocks which also possess the same matching characteristic. In some embodiments, these groups of matching adjacent blocks may have to all be connected in one direction, i.e. they may have to be either vertically or horizontally connected. The match check is implemented after the player selects the two blocks to switch tile locations.

The following sections will refer to a game with a switcher mechanic. The ideas explained may also be implemented for games with other mechanics.

To exemplify the invention, one particular game will now be described. It will be evident that the features described herein may be applied in many different games.

Figure 6:
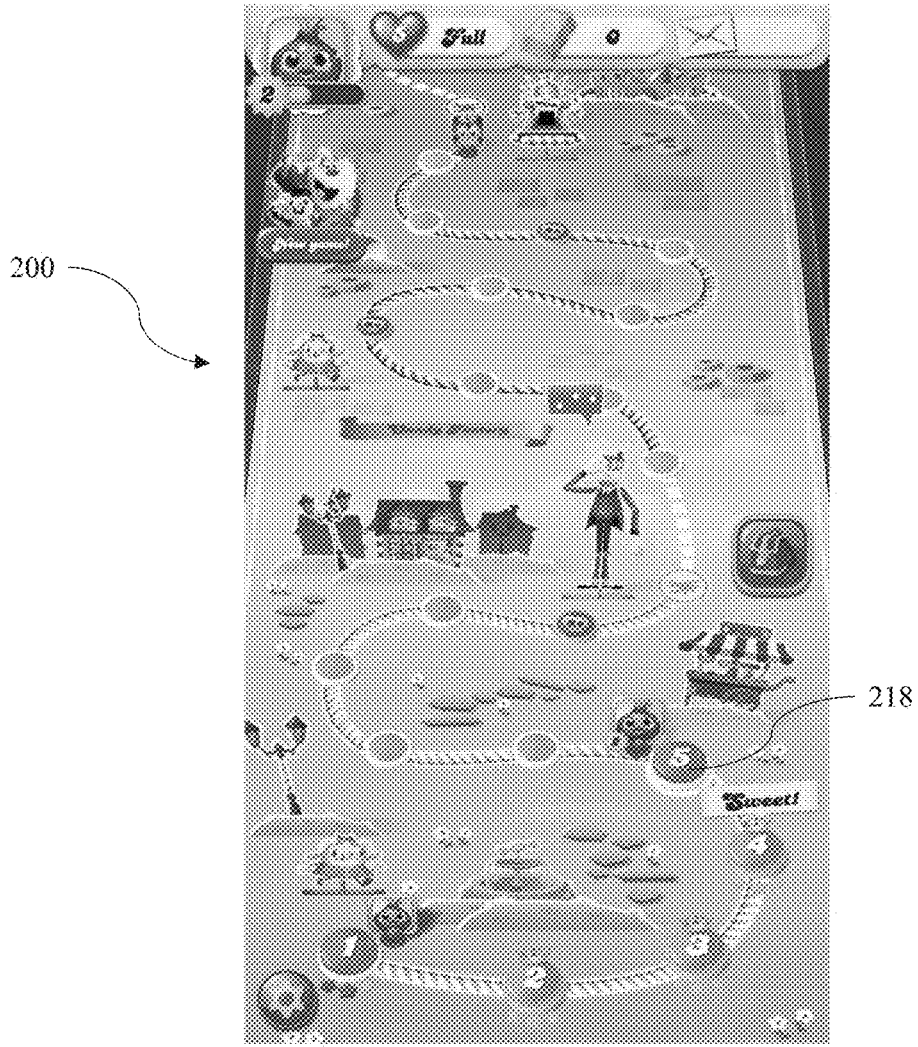
FIG. 6 shows a Saga Map.

FIG. 6 shows an example of a Saga Map 200 presented to the user on the display of his client device 240.

On the Saga Map 200, the user is presented with a path of levels, each level having a level icon 218. The player must complete a level for the next level on the path to become playable. The levels may become progressively more challenging as the player travels along the path. When a level is playable, the level icon 218 shows the level number.

Figure 7:
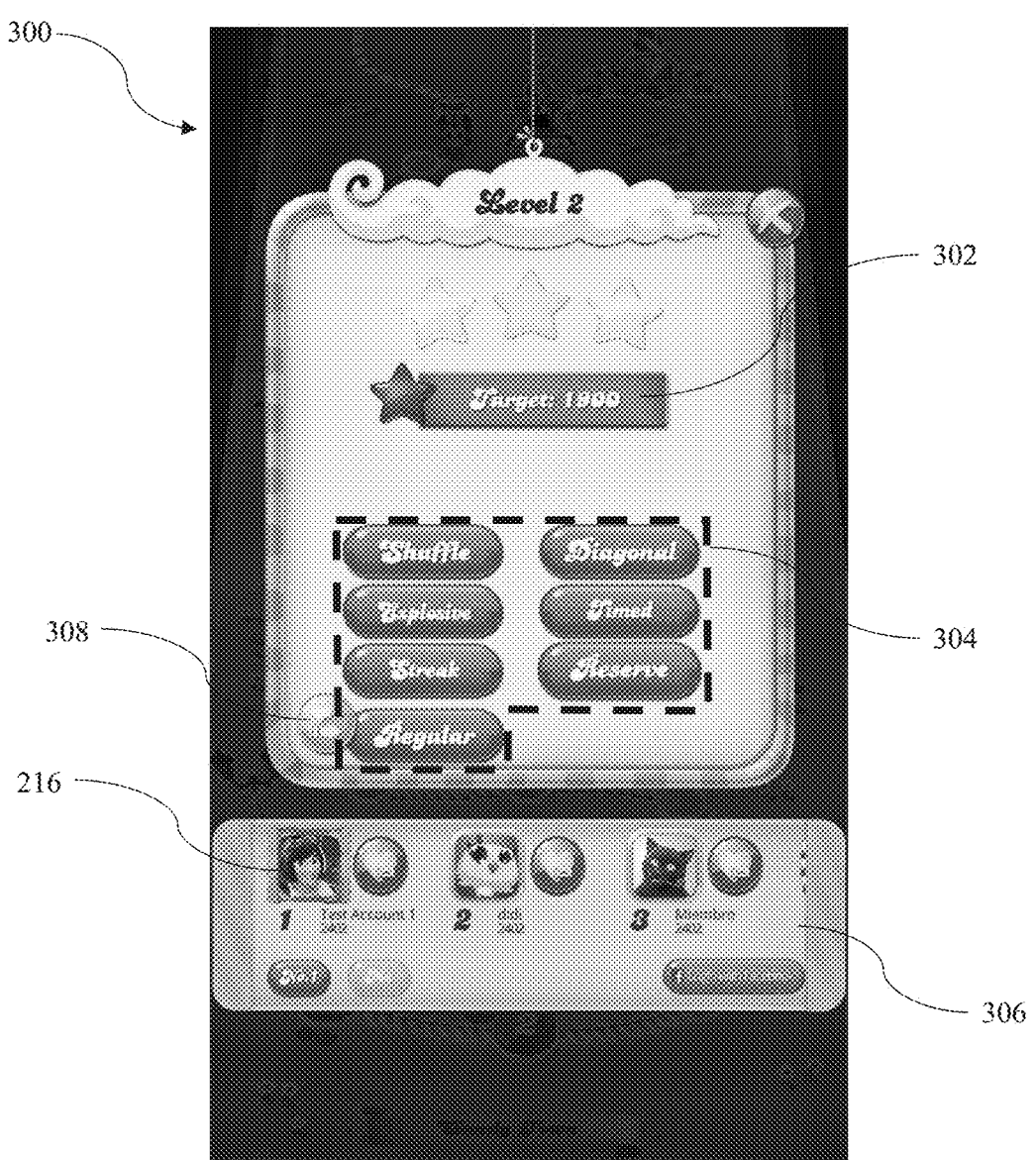
FIG. 7 shows a pre-level display.

The user selects one of the activated level icons 218 to access the level. He may first be presented with the pre-level screen 300, an example of which is shown in FIG. 7. The level the player has selected to play is indicated. A target 302 is presented to the player. In this example, the target 302 is the number of points the player must achieve to pass the level. There may be other additional goals the for the player to achieve in order to pass a level, which are presented to the player on the game play display 108.

A leader board 306 displays opponent icons 216 of the three highest scores of the level so far, as well as the scores they achieved. The opponents shown may be from the group of friends the user has connected with, or they may be from a list of all players who have, for example, synced their scores with the external server, even if they are not connected with the player.

The player is presented with game mode options in the form of selectable objects 304. In this example, seven different game mode options 304 are presented to the user for him to choose from. Each of the game mode options 304 presents the user with different game rules for the level he is about the play. The gameboard 100 and goals the user has to achieve in order to complete the level are the same irrespective of the game mode options 304 the user chooses.

Allowing the user to choose the game mode option in which he plays the level allows the user to play more strategically. He may find, for example, that he scores more highly in when implementing some game mode options than others, so may wish to choose a game mode option 304 which plays to his strengths.

A goal indicator 308, here positioned adjacent to the 'Regular' mode option button, shows the user the type of goal he will be presented with in the level he is about to play. The appearance of the goal indicator 308 indicates the type of goal the player has to achieve in the level, such that different types of goals have visually different goal indicators 308. The type of goal may be, for example, collecting a particular type of displayed item, e.g. acorns, at the bottom of the gameboard, spreading 'jam' (a type of attained background appearance in the tiles) on the gameboard, or removing a pre-defined number of blocks from the gameboard. By giving the user this information before he attempts the level, the user can strategically choose the game mode option 304 which he wishes to play the level in. For example, the user may achieve the goal of collecting items at the bottom of the gameboard 100 more easily when playing in the 'Explosive' game mode option.

Game mode options are associated with rule modifications which modify the 'normal' rules associated with that level.

Figure 8:
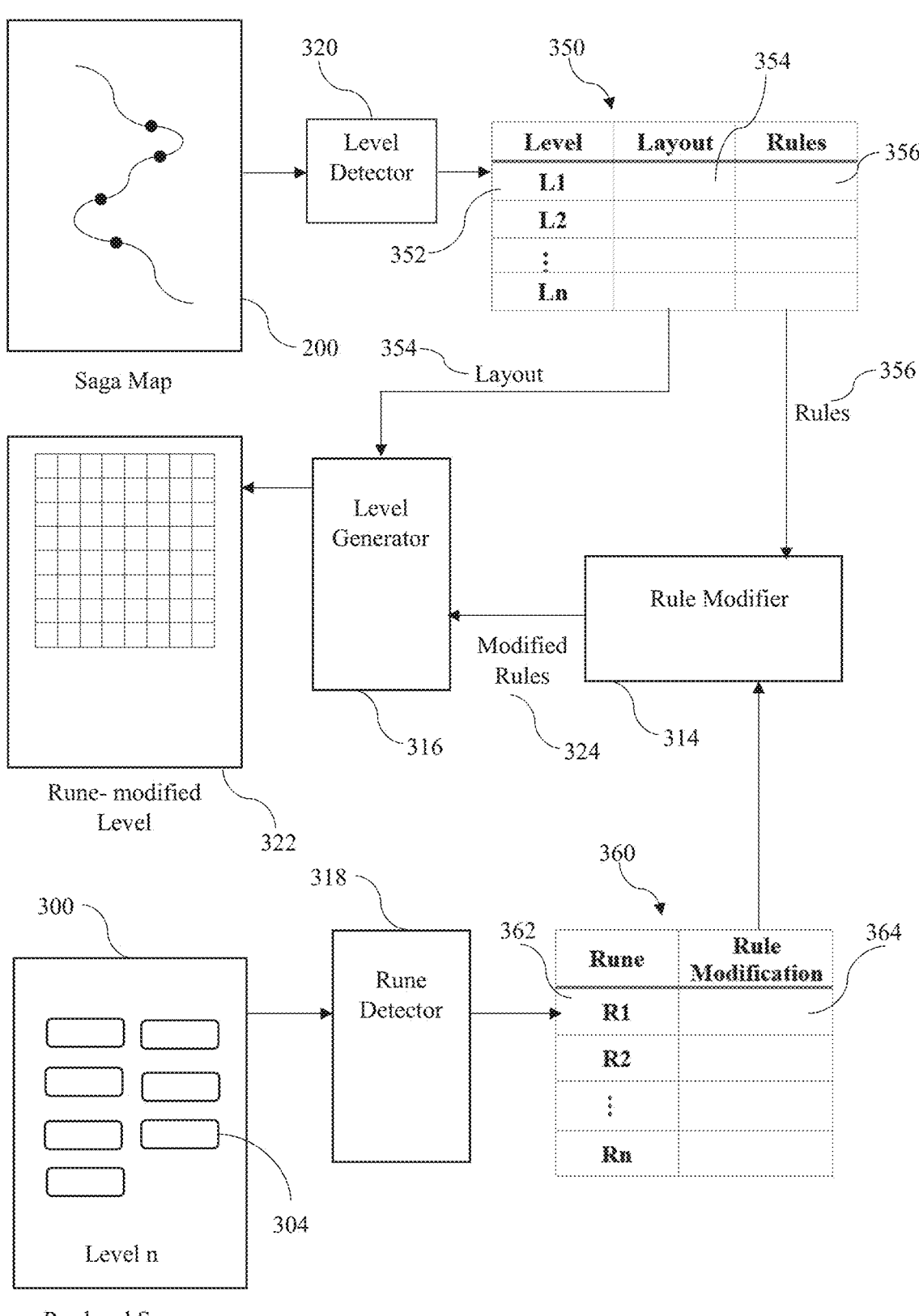
FIG. 8 shows a schematic block diagram of a system for generating a modified level.
Figure 9:
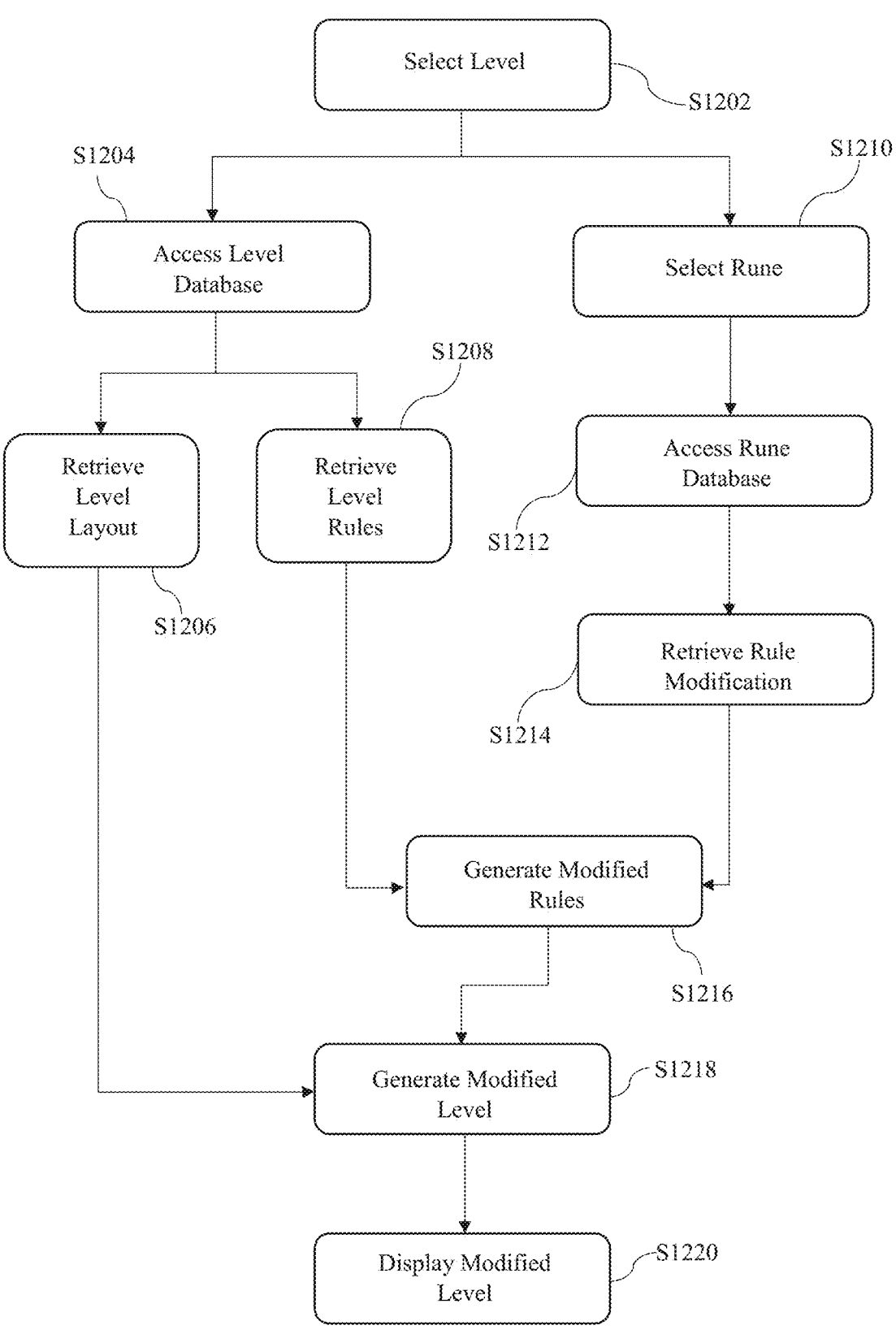
FIG. 9 shows a method for generating a modified level.

FIG. 8 shows a schematic block diagram illustrating a process for generating a modified level, and a method for achieving this is shown in FIG. 9.

At step S1202, the user selects the level he wishes to play from the Saga Map 200 as shown in FIG. 6. A level detector 320 detects which level the user has requested to play, and accesses a level database 350 at step S1204.

The level database 350 stores information about the different levels of the game. A layout 354 and rules 356 are stored in association with a level number 352, corresponding to the number assigned to the level icon 218 on the Saga Map 200.

The level layout 354 defines the grid 80. It defines the number of tiles in the grid 80, the outline of the grid 80, and the attributes of tiles within the grid 80. The level layout 354 and game attributes of the initial gameboard are the same irrespective of the game mode option, also referred to as a rune, chosen by the player.

The level defines an initial game attribute for each of the tiles of the gameboard 100 when the level starts. The game attribute is the characteristics of game element occupying the tile, that is, whether the tile is occupied by a blocker, booster, or candy, or is unoccupied. Although the game attributes of each tile may change during gameplay, the level layout 354 defines the initial game attributes, such that game attributes are the same every time the user starts the same level. For example, the level layout 354 may define that there are 2 blockers on the gameboard 100 when the level starts, and the rest of the tiles on the gameboard 100 are filled with candies (switchable game elements which the player is trying to match). The tiles in which the blockers and candies are located may also be defined. In some embodiments, initial game attributes may only be defined for some of the tiles on the gameboard. For example, the game attributes of tiles which are to be occupied by blockers at the beginning of the level may be defined, but the other tiles on the gameboard may not have a defined initial game attribute such that the tiles may be randomly or pseudo-randomly filled with any other game elements, such as candies and boosters. The initial game attributes for tiles containing other types of special game elements may also be defined. After the gameboard 100 has been set up, as defined by the level layout 354, the rules 356 are implemented. The seed(s) which is used for block refill may be defined by the level layout 354.

The rules 356 define the goal(s) and target of the level and the number of moves the player is allowed to complete the level in. The rules 356 control the display of game outcomes, such as which tile locations elements can be switched between and the functions of different boosters.

The layout 354 and rules 356 associated with the level 352 which the user has selected are retrieved from the level database 350 at steps S1206 and S1208 respectively. The layout 354 is passed to the level generator 316. The rules 356 are passed to the rule modifier 314.

Once the user has selected the level he wishes to play from the Saga Map 200 at step S1202, he is presented with the pre-level screen 300, as shown in FIG. 7. The user selects a rune 304, also referred to as a game mode option, from the pre-defined set of options at step S1210. His selection is detected by a rune detector 318. The rune detector identifies a rune identifier 362 associated with the selected rune 304 on the pre-level screen, and uses the rune identifier 362 to access data stored in a rune database 360 at step S1212.

In the rune database 360, a rule modification 364 is stored in association with the rune identifier 362. The rule modification 364 defines the way in which the selected rune 362 modifies the game rules. The rule modification 364 does not affect the fundamentals of the level, that is the layout 354 and initial tile attribute are unaffected by the rule modification 354. In some embodiments, the rune identifier 362 is stored in association with a set of rule modifications, such that the rule modifications, when implemented, alter more than one of the game level rules.

In an alternative embodiment, the rune identifier 362 is stored in association with a set of modified rules. These rules are accessed from the rune database 360 and passed to the level generator 316 to be used as the rules of the level. This set of modified rules may be an entire set or rules, such that they replace the level rules 356 in their entirety.

Using the identified rune identifier 362, the rule modification 364 stored in association with said rune identifier 362 is retrieved from the rune database 360 at step S1214.

The rule modification 364 is sent to the rule modifier 314. The level rules 356 are combined with the rule modification 364 at the rule modifier 314 to generate a set of modified rules 324 at step S1216. The level rules 356 and rule modifications 364 are combined in such a way that all rules defined in level rules 356 are used, except those which relate to the rules defined by the rule modifications 364. The rules defined by rule modifications 364 supersede the corresponding rules as defined by the level rules 356. For example, the level rules 365 may define that a line blast booster removes all elements from the gameboard 100 in its row when activated. The rule modifications 364 may define a different characteristic of a line blast booster, for example that it removes all elements in both the row and column in which it lies. Thus, the characteristics of the line blast booster as defined by the rule modifications 356 would be used in the set of modified rules 324.

The modified rules 324 are then passed to the level generator 316, which uses the modified rules 324 and the layout 354 to generate the modified level 322 at step S1218. The modified level 322 is then displayed on the display of the client device 240 at step S1220.

It will be appreciated by a person skilled in the art that the steps of the method shown in FIG. 9 may be performed in a different order. For example, it is shown that data is accessed from the level database 350, step S1204, simultaneously to the user selecting a rune 304, step S1210, the rune database 360 being accessed, step S1212. However, in alternative embodiments, these two branches of the method may be performed in series. For example, the user may only select the rune 304 after the layout 354 and rules 356 have been retrieved and sent to the level generator 316 and rule modifier 314 respectively.

This process is repeated every time the player wishes to play a level. That is, the player selects a game mode option 304 from the pre-level display 300 before playing a level regardless of whether he has returned to the Saga Map 200 or not. For example, if a player fails to complete a level, he has the option to retry the level rather than returning to the Saga Map 200. He is then presented with the pre-level display 300 from which he chooses a game mode option 304 to play the level in again. That is, the game mode option 304 does not stay selected once the level has finished, whether that be when the player runs out of moves or time, or when the player completes the level. By allowing the user to change the game mode 362 if he fails a level, the user can choose a game mode option 304 which he believes is better suited to the level having attempted it. The user cannot change the game mode option 304 once the level has started.

In some embodiments, the game mode option 304 selected by the user stays selected when he progresses to the next level or replays his current level. This removes the rune selection step, S1210, from the example method of FIG. 9. This may also remove the steps of accessing the database, S1212, and retrieving the rule modifications, S1214, if the rule modifications associated with the selected rune are stored locally.

In some embodiments, the user may choose to play the selected level without modifying the level rules. This may be through an active selection of a game mode option 304 indicating that no rule modifications are desired, such as the 'Regular' game mode option shown in FIG. 7. Alternatively, the user may choose to play without any rule modification by not selecting a rule modifying rune 304. If the user chooses to play the level without modifying the game level rules, the steps of accessing the database, S1212, and retrieving the rule modification, S1214, may be removed from the method of FIG. 9. In some embodiment, the database may still be accessed, but the rune identifier 362 associated with the 'Regular' game mode option 304 may not be associated with any rule modification 364, such that the level rules remain unmodified.

FIG. 7 shows seven example game mode options. Each of these options may be associated with one or more different rules modifications 364 as explained above. The generated modified rules 324 determine the game outcome for each of the selected runes. It will be appreciated that the user may be presented with more or fewer game mode options 304 to choose from.

The selection of a 'Reserve' rune modifies the rules to present the user with an additional game element outside the gameboard which he can swap with any game element on the gameboard, such that altering the gameboard is the game outcome. The selection of a 'Timed' rune modifies the rules to swap the number of moves the player has to attain the level objective in for a time the player has to attain the level in, the time being displayed as the game outcome. The selection of a 'Diagonal' rune modifies the rules to allow the user to swap game elements situated at tile locations which are diagonal to one-another, the allowable diagonal switch being the game outcome. The selection of a 'Shuffle' rune modifies the rules to present the user with a switching button which, when activated, causes the tile locations of at least some of the game elements on the gameboard to change, the altered arrangement of the game elements on the gameboard being the game outcome. The selection of an 'Explosive' rune modifies the rules to eliminate multiple rows or columns when a striped candy booster is selected, and at least one column or row respectively, the removal of multiple rows and columns being the game outcome. The selection of a 'Streak' rune modifies the rules to present the user with a game element removal element when the user has consecutively matched a predefined number of groups of the same type of element, the game element removal element removing all elements of a common type form the gameboard, the removal of these elements being the game outcome.

The rune examples of FIG. 7 are described in more detail below.

Figure 10:
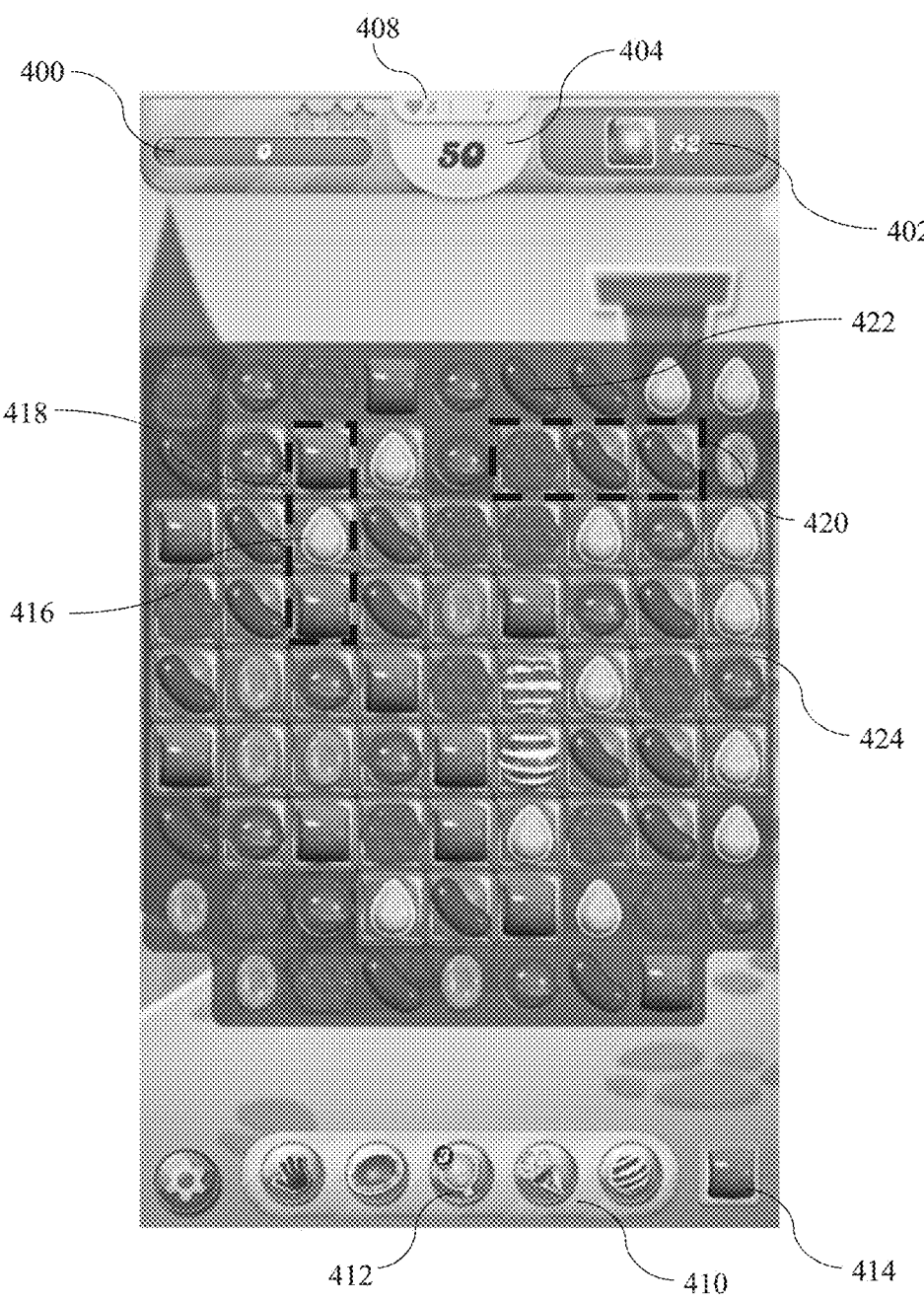
FIG. 10 shows a 'Reserve' game mode option gameplay display.

FIG. 10 shows an example of the 'Reserve' game mode option. The goal of the level is shown in the goal area 402. In this example, the user must remove 52 jelly squares from the gameboard 100. Tile 424 can be seen to contain jelly. The jelly is removed from the gameboard 100 by the user removing game elements from the gameboard through the generation of groups of matching elements at the tile location of the jelly. The jelly may be associated with a certain tile of the gameboard, such that the location of the jelly does not change when game elements are removed from the gameboard 100 and block refill occurs. As the player removes jellies, the count in the goal area 402 decreases respectively.

A moves counter 404 shows the user how many moves he has remaining to try to complete the level. When the player makes a move, the value of the moves counter decreases by one. If the player fails to achieve the goal(s) as shown in the goal area 402 before the value of the moves counter 404 reaches 0, the player fails the level.

A points bar 400 shows the player how many points he has accumulated so far in the level. He must reach the points target 302 as shown on the pre-level display 300 in order to pass the level. In some embodiments, the points target 302 corresponds to the goals of the level, such that, if the player achieves the goal(s) he is presented with for the level, he will also achieve the target 302. Any moves he makes which do not contribute towards the goal(s) may then award him additional points. In other embodiments, the player may be required to perform significantly more moves than the moves required to achieve the goal(s) in order to accumulate enough points to reach the target 302.

If the player fails the level, he loses a life. A lives counter 408 shows the number of lives the player has remaining.

In the 'Reserve' game mode option, the player is given a reserve element 414 which he can replace any gameboard element with. To do this, the player selects the reserve element 414 and then selects the element on the gameboard 100 which he wishes to replace the reserve element 414 with. The replaced gameboard element then becomes the reserve element 414.

For example, the player may choose to replace pear drop gameboard element 416 with the reserve element 414. In the example of FIG. 10, the reserve element 414 is a square element, but it will be appreciated that reserve element 414 may be any game element type. If the player chooses to do so, the pear drop gameboard element 416 becomes the reserve element 414, and the reserve element 414 takes the place of the pear drop gameboard element 416 on the gameboard 100. In this example, the player creates a group of matching adjacent square elements at location 418, which are subsequently removed from the gameboard 100. The player may choose to replace a different element with the reserve element 414. This may not result in a match. However, the player may choose to do this in order to acquire a different reserve element 414 which he can use in a subsequent move to create a group of matching adjacent elements.

The player does not have to use the reserve element 414. He can make plays in the usual manner. For example, the player may choose to switch the bean gameboard element 422 with the gameboard element below it, so creating a group of matching adjacent bean elements at location 420, which are then removed from the gameboard 100.

A pacing mechanic may also be introduced in the 'Reserve' game mechanic. This mechanic prevents the user from using the reserve element 414 excessively in the level. For example, the pacing mechanic may prevent the user from using the reserve element 414 in consecutive moves. Another example is that any group of matching adjacent elements created using the reserve element 414 may have to contain four or more matching adjacent elements.

There is a booster bar 410 at the bottom of the display. If the user has boosters which are available to him to be used in the level, they are displayed here. For example, the user has accumulated three lollipop hammer boosters, as indicted by the number 3 next to the lollipop hammer booster icon 412.

Figure 11:
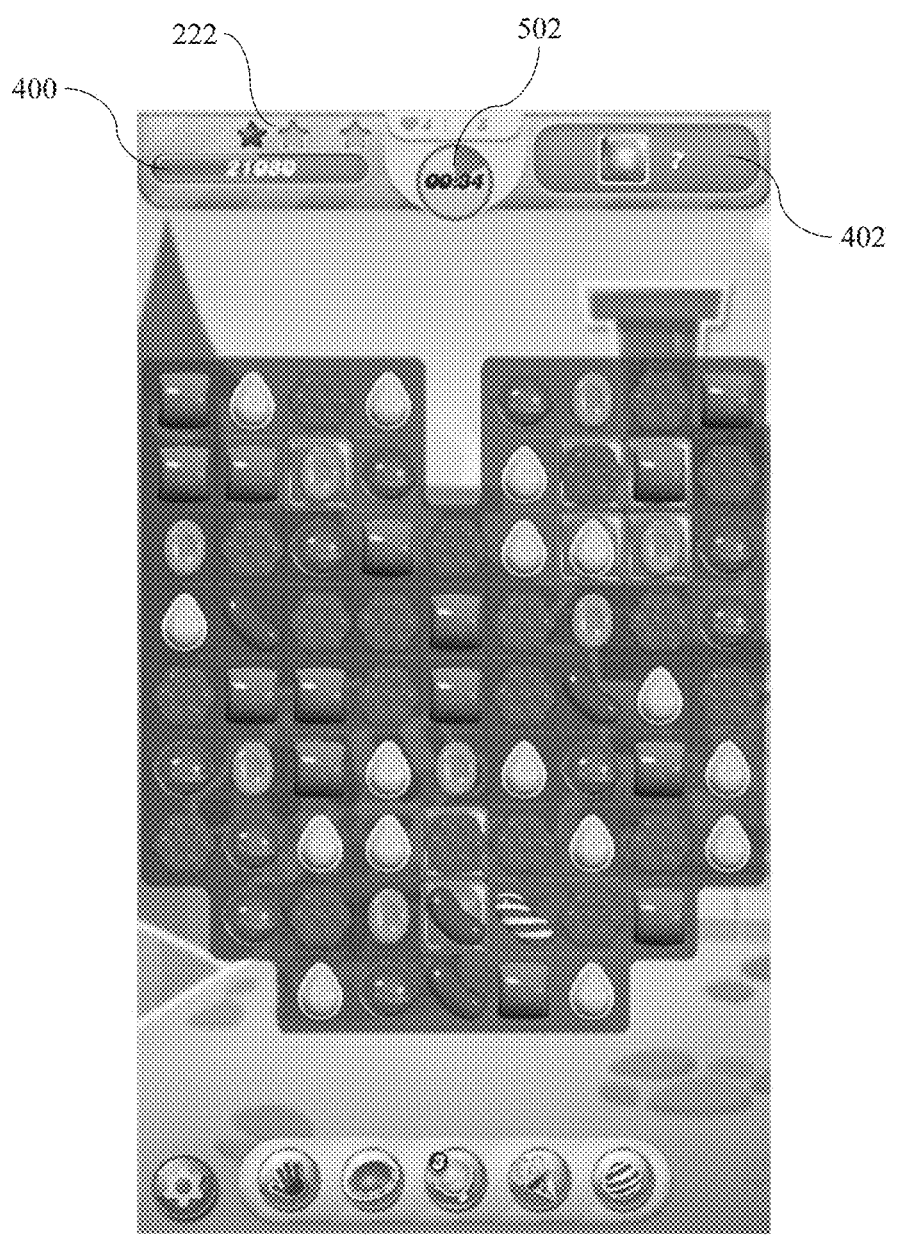
FIG. 11 shows a 'Timed' game mode option gameplay display.

FIG. 11 shows an example of a 'Timed' game mode option. As before, the player is presented with goals in the goal are 402, and the points he has accumulated are shows in the points bar 400. The number of accumulated points corresponds to the stars 222. The more points the player accumulates in the level, the more stars he is awarded.

In the 'Timed' game mode option, the player has to achieve the goal(s) within a pre-defined time, rather than in a pre-defined number of moves. The time the player has remaining is shown by a countdown 502. The player makes matches by switching adjacent game elements to create groups of matching adjacent elements, which are then removed from the gameboard 100.

The time for which the player has to complete the level is a modification 364 associated with the 'Timed' rune identifier 362. The defined elements 356 define the number of moves the player has to complete the level in. The modification 364 then converts this number into a time. That is, levels which give the player more moves to compete the level in will give the player more time if he chooses to play the level in the 'Timed' mode, such that the number of moves is converted into an amount of time.

In addition, the algorithm for determining when the allowable number of moves for the level has run out is replaced in the rule modification by an algorithm for determining when the allowable time has run out. Both of these algorithms determine if the user has failed the level.

In some embodiments, the user may be able to switch between having a number of moves to perform the level in and having a time to perform the level in during gameplay. That is, the user may, for example, start the level with 50 moves to complete the level in, and then once he has performed 20 moves, he can change the remaining 30 moves to a time in which he must complete the rest of the level. This may also be performed the opposite way around, such that the user changes remaining time to remaining moves.

Figure 12B:
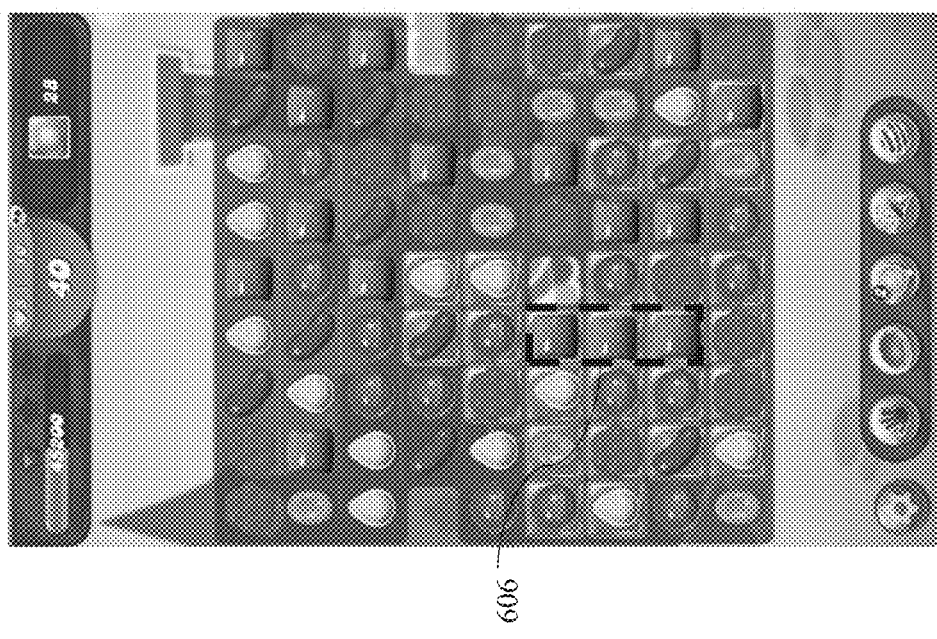
FIGS. 12A-12B show a 'Diagonal' game mode option gameplay display.
Figure 12A:
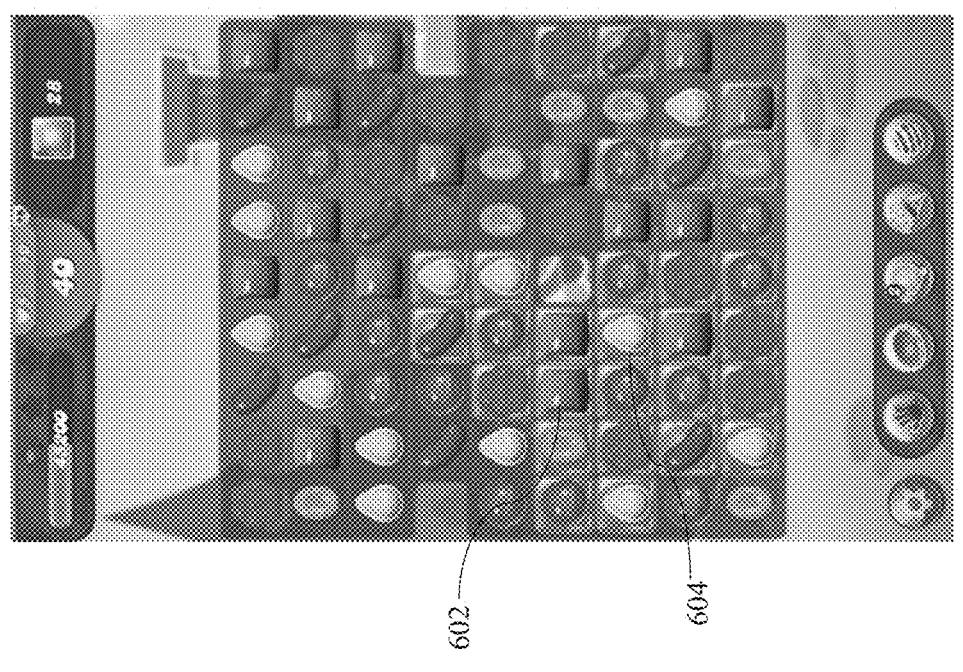

FIGS. 12A and 12B show an example of a 'Diagonal' game mode option. Again, the user removes elements from the gameboard 100 by making groups of matching adjacent elements. However, in this mechanic, the user may switch gameboard elements which are located in tiles which are diagonal to each other. For example, the user can switch the square element 602 with the pear element 604. This creates the group of matching adjacent square elements 606, which is subsequently removed from the gameboard 100.

Figure 13B:
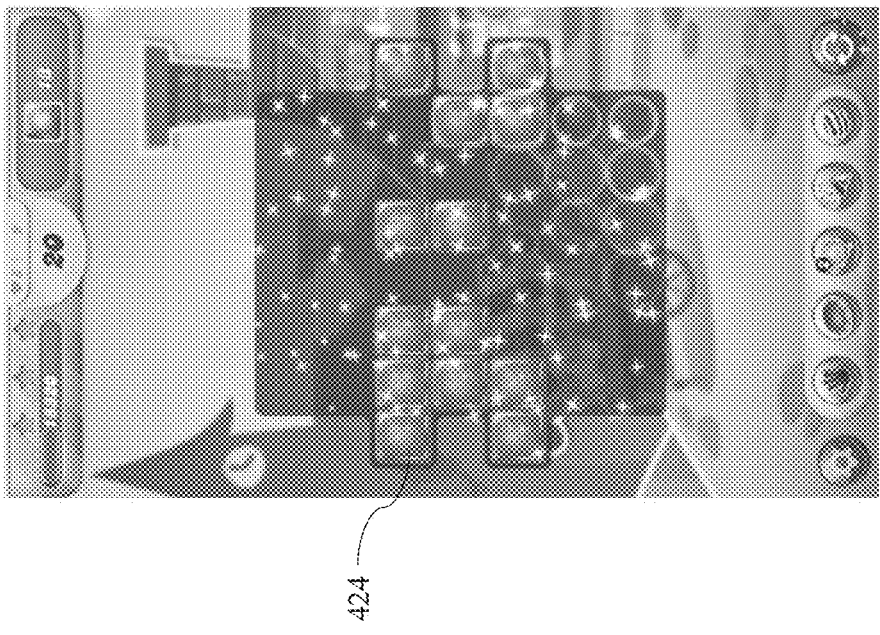
FIGS. 13A-13C show a 'Shuffle' game mode option gameplay display.
Figure 13A:
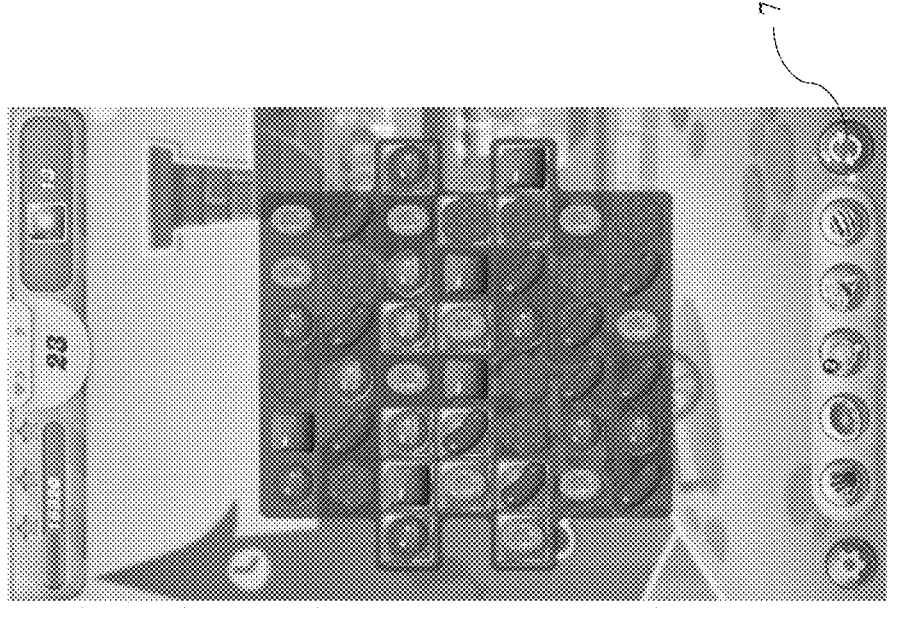
Figure 13C:
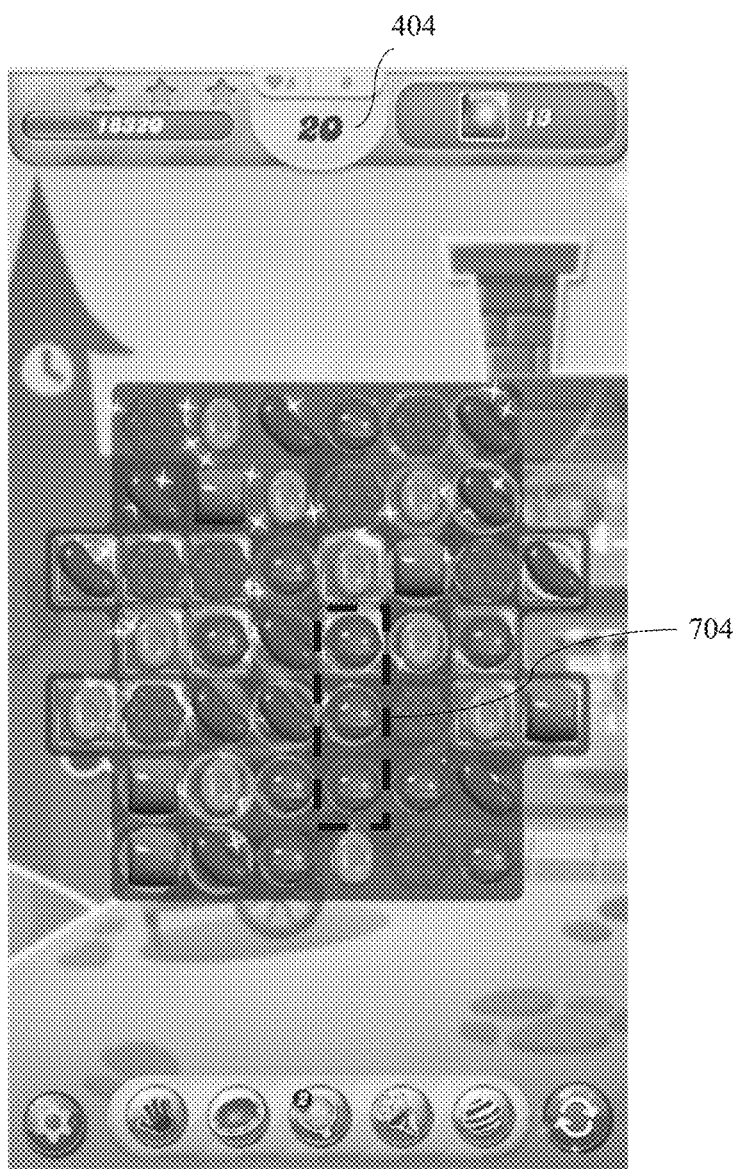

FIGS. 13A-13C show an example of a 'Shuffle' game mode option. A shuffle button 702 is presented to the user on the game play display 108. If the user cannot see any moves to make on the gameboard 100, he may choose to select the shuffle button 702 in order to shuffle the gameboard elements on the gameboard, such that the arrangement of the elements on the gameboard is different.

In FIG. 13A, the user selects the shuffle button 702. The game elements are then removed from the gameboard 100, as shown in FIG. 13B. It can be seen that the jelly squares 424 have been left at the tile locations that they were previously in. In some embodiments, the jelly squares 424 may also be shuffled.

The gameboard elements are then placed back on the gameboard 100, but in different tile locations, as shown in FIG. 13C. These are the same gameboard elements as were on the gameboard 100 before the user executed the shuffle mechanic, so the gameboard 100 shown in FIG. 13A. That is, there are the same number of each type of game element on the gameboard 100 both before and after the shuffle has been implemented.

Once the gameboard elements have been shuffled, any groups of 3 or more adjacent matching elements are removed. For example, in FIG. 13C there is a group of matching adjacent lollipop elements 704. These elements are then removed from the gameboard 100 without the user having to select the group 704. The moves counter 404 does not decrease in value for the removal of these elements, since the player did not select them for removal.

Using the shuffle mechanic uses one or more of the user's allowable moves. In the example of FIGS. 13A-13C, the use of the shuffle button 702 uses 3 of the player's allowable moves, as shown by the decrease in value of the moves counter 404. This deters the user from excessively using the shuffle mechanic in order to create groups of matching adjacent elements without using any moves.

Figure 14B:
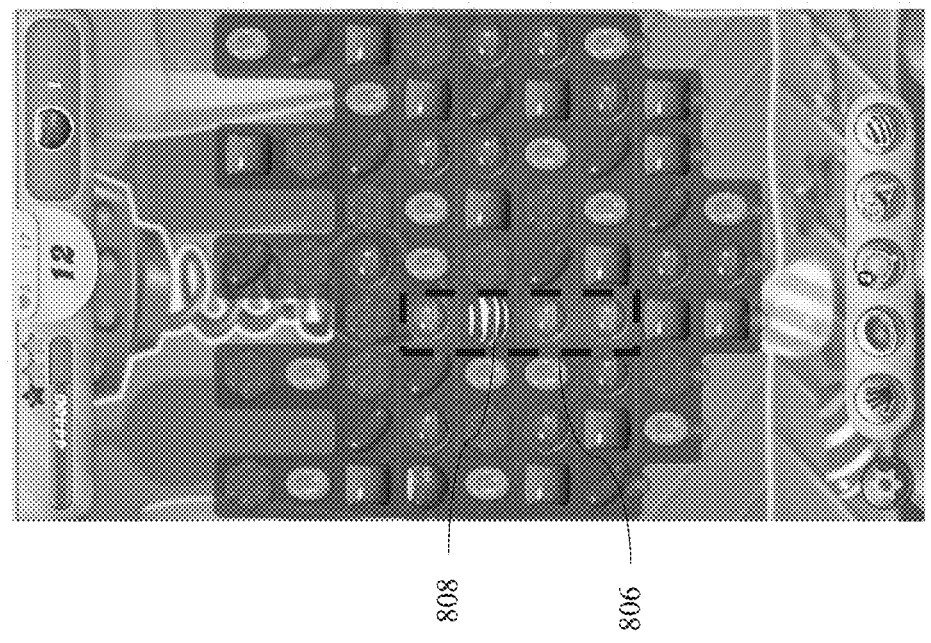
FIGS. 14A-14E show an 'Explosive' game mode option gameplay display.
Figure 14A:
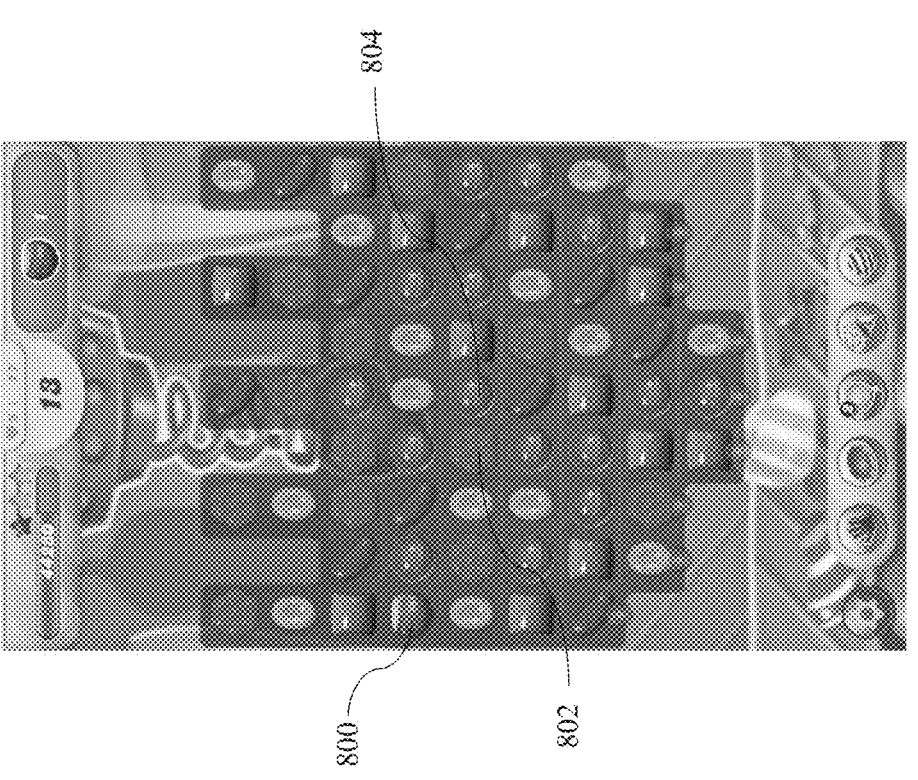

FIGS. 14A-14E show an example of an 'Explosive' game mode option. FIG. 14A shows the gameboard 100 when the player has 13 moves remaining. The aim of this level is to collect acorns 800 at the bottom of the gameboard 100. This is achieved by removing the game elements below the acorn 800 so that it falls downwards towards the bottom of the gameboard during gameboard refill.

The player switches the lollipop element 804 with flower element 802. This results in the formation of a group of matching adjacent lollipop elements 806 as shown in FIG. 14B. Since there are 4 elements in the group of matching adjacent lollipop elements 806, a striped candy 808 is formed. This is generated at the tile location of the switched element, so at the original tile location of the flower element 802. Here, the striped candy 806 has stripes in the horizontal direction. The elements in the group of matching adjacent lollipop elements 806 are removed from the gameboard 100.

Striped candies are a type of booster. In a normal switcher mechanic, when activated, the striped candy removes all of the elements in the row or column in which it is situated. If the stripes on the striped candy are vertical, the column elements are removed, and if the stripes are horizontal, the row elements are removed. Striped candies may be generated as described above in a normal switcher mechanic. They may also be spawned during gameboard refill.

When the group of matching adjacent lollipop elements 806 is removed from the gameboard 100, the striped candy 808 is activated. In the 'Explosive' game mode option, the effects of the striped candy 808 are extended to the rows and columns either side of the row and column in which the striped candy 808 is situated. Thus, all of the elements in the row the striped candy 808 is in, and the row above and below that row are removed. This is shown in FIG. 14C, in which all of the game elements in area 810 are removed.

Figure 14D:
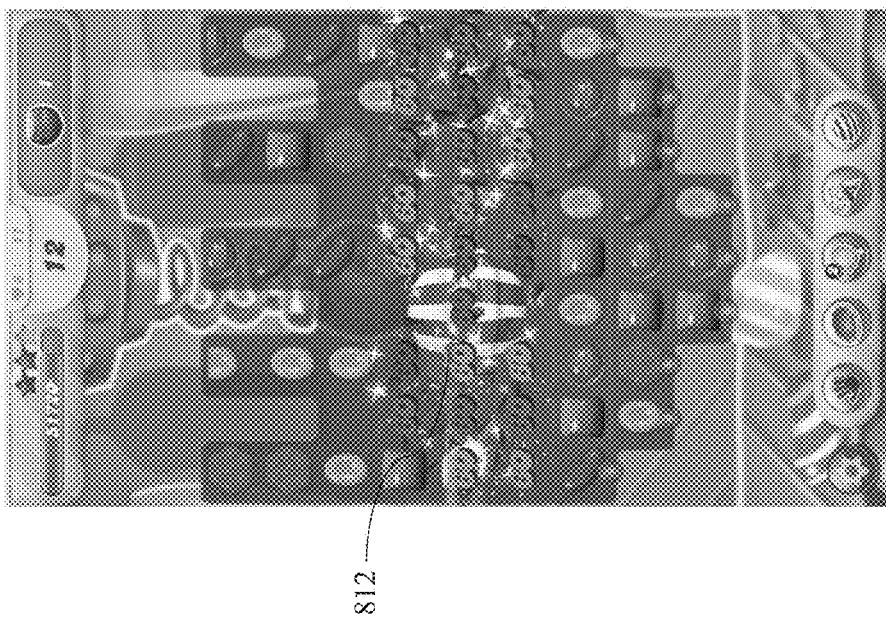
Figure 14C:
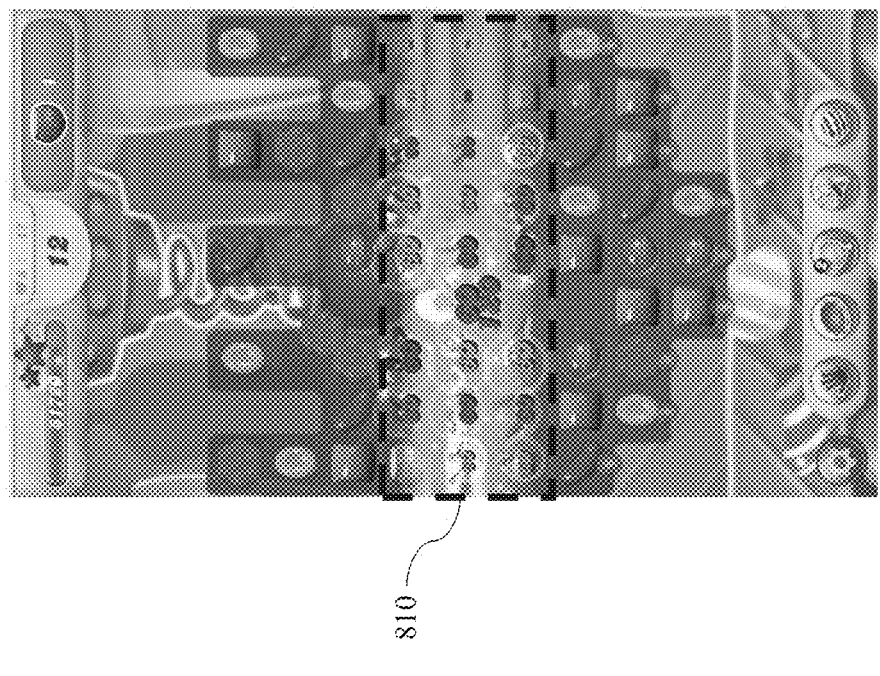
Figure 14E:
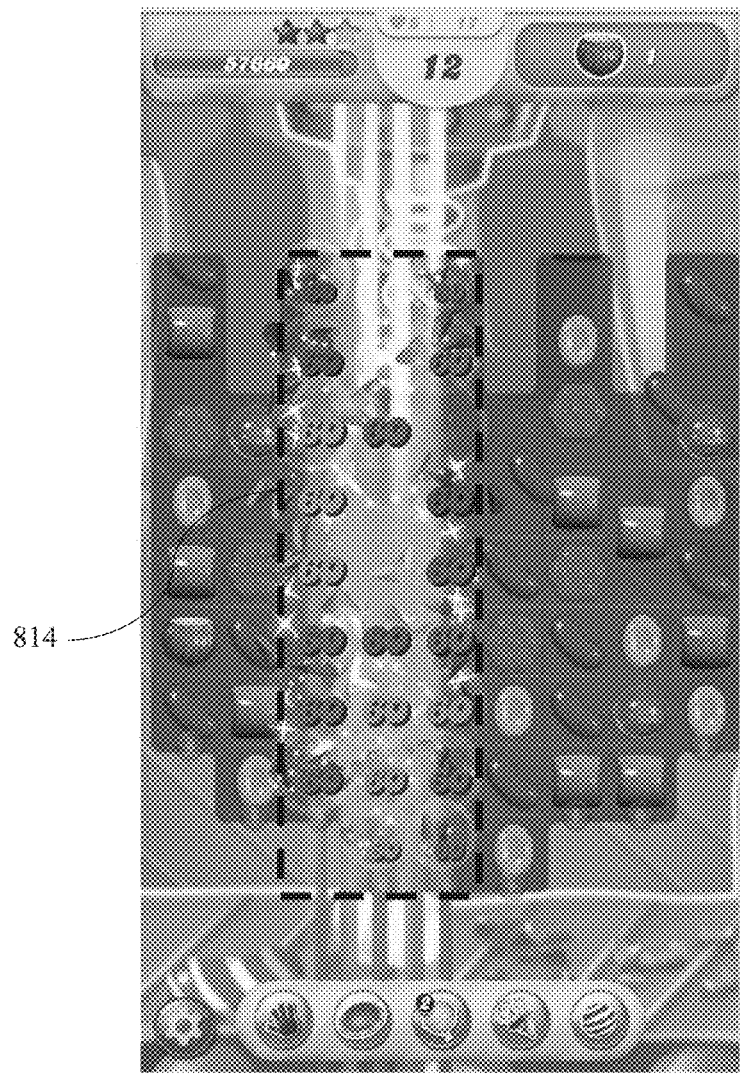

A second striped candy 812 is generated at the tile location of the first striped candy 808, as shown in FIG. 14D. This second striped candy 812 has stripes perpendicular to those of the first striped candy 808.

The second striped candy 812 is activated when it is generated. This results in all of the elements in the column in which the striped candy is in, as well as all of the elements in the column to the left and right of the column being removed from the gameboard 100, that is, all elements in area 814 are removed, FIG. 14E.

The gameboard 100 may only be refilled after both the first striped candy 808 and the second striped candy 812 have been activated and the elements removed from the gameboard. Alternatively, there may be a gameboard refill between the first striped candy 808 and the second striped candy 812 being activated. The second striped candy 812 remains at the tile location of the first striped candy 808.

FIG. 15A-15E show an example of a 'Streak' game mode option. In this game mode option, the user makes consecutive matches of the same type of elements in order to acquire a streak booster.

Figure 15B:
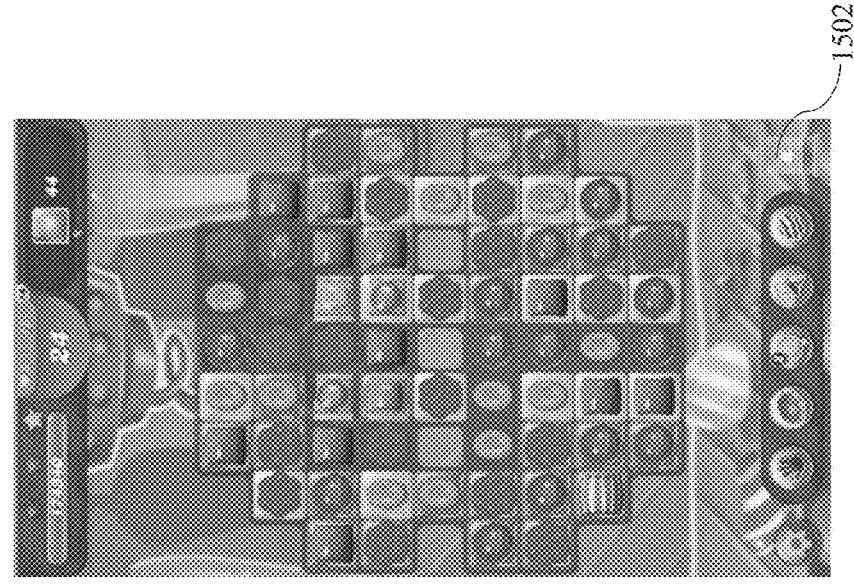
FIGS. 15A-15E show a 'Streak' game mode option gameplay display.
Figure 15A:
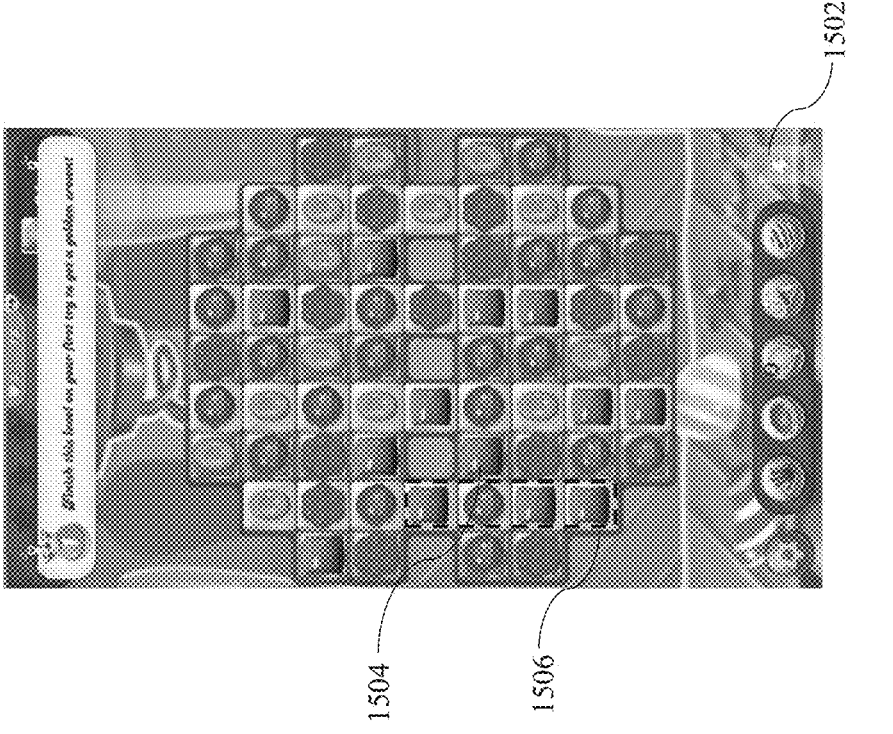

FIG. 15A shows the gameboard 100 at the start of the level. There is a power bar 1502 at the bottom of the display. The power bar 1502 is shown to be empty at the beginning of the level. The user makes a first move of switching the green square element 1504 with the lollipop element in the tile location to the left of it, in order to create a group of matching green square elements in tile locations in area 1506. These tiles are removed from the gameboard 100 and gameboard refill occurs.

FIG. 15B shows the gameplay display after the gameboard refill has been completed. One quarter of the power bar 1502 has been filled in green, corresponding to the colour of the removed group of matching square elements. Each time the user makes a consecutive match of the same type of element, the power bar 1502 fills up by a further quarter. It will be appreciated that the power bar 1502 may be split into any number of portions. The power bar may not necessarily visually show the portions into which it is split.

If the next match the user makes is not of a group of square elements, the power bar 1502 will be emptied (reset to zero). It may then be filled to one quarter with the colour corresponding to the just-matched group of elements. In some embodiments, if the power bar 1502 is filled by more than one quarter when a different element type match is made, the power bar 1502 may not completely empty, but only one quarter of the filled portion of the power bar 1502 will be emptied. In other embodiments, the power bar 1502 does not empty when the type of consecutively matched elements changes. For example, if the power bar 1502 is half full when the user makes a match with a different type of element, the power bar may remain half full until the user makes another consecutive match of any type of element, which results in the power bar 1502 filling by another increment.

Figure 15D:
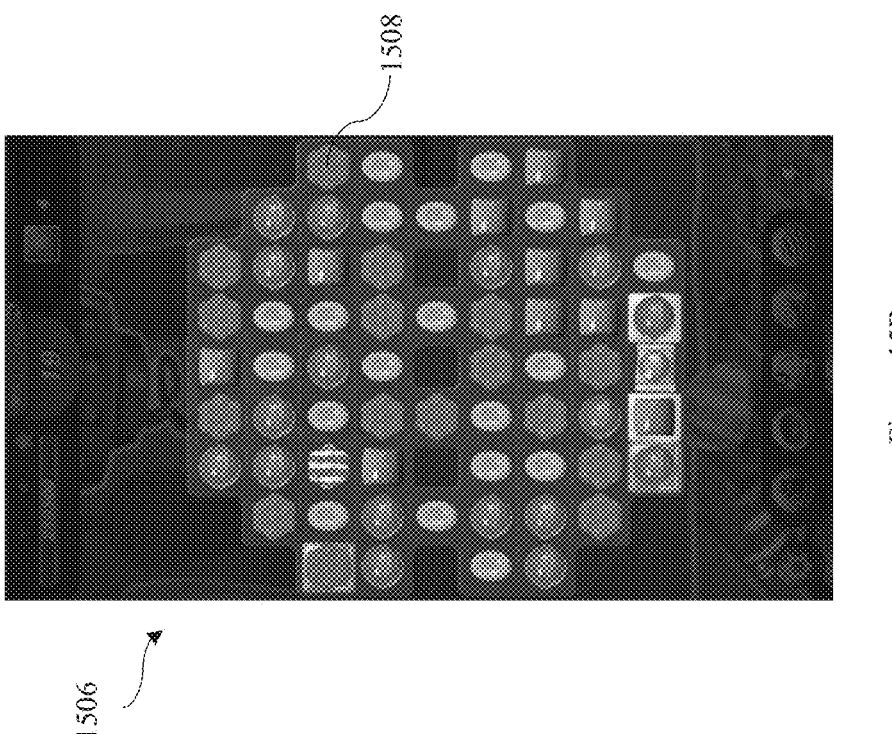
Figure 15C:
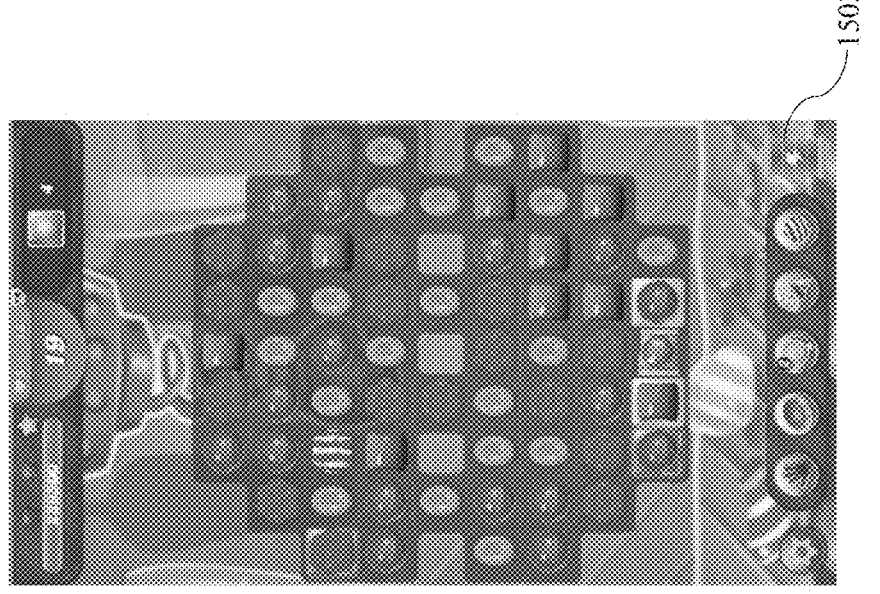

Once the user has completed four consecutive matches of the same type of element, the power bar 1502 is full, as shown in FIG. 15C. The power bar 1502 can then be selected by the user, and he is shown a streak display 1506 as shown in FIG. 15D. The user then selects any element on the gameboard 100. For example, the user selects flower element 1508. This activates the power bar 1502 which removes all flower elements present on the gameboard 100 at the time of selection from the gameboard 100. That is, the user can decide which type of element he wants to eliminate form the gameboard 100.

Figure 15E:
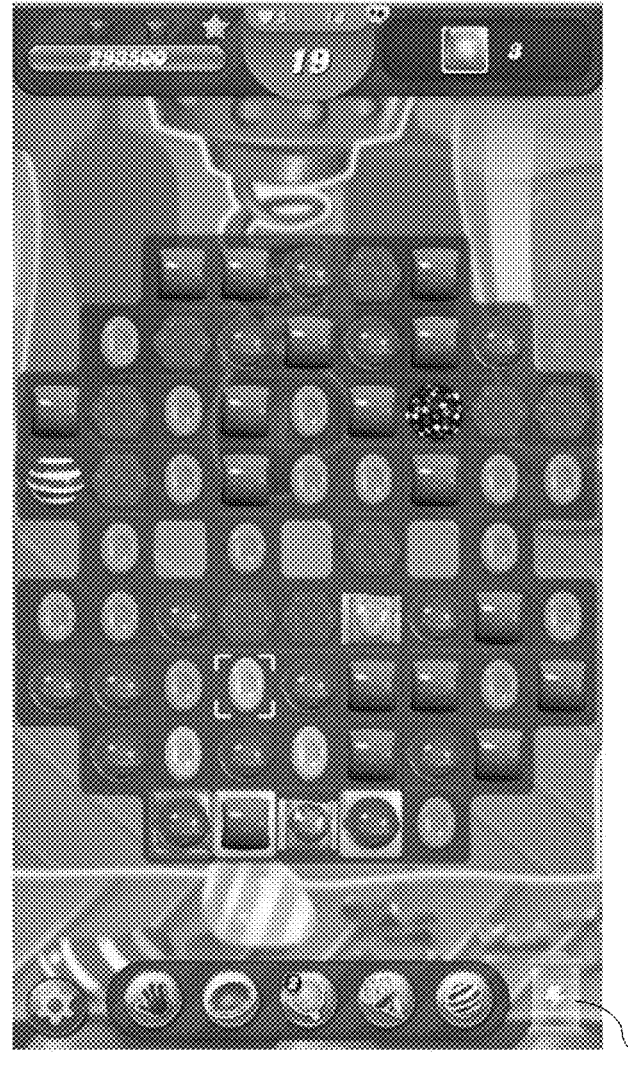

The flower elements are removed from the gameboard 100 and then gameboard refill occurs. The power bar 1502 is emptied, as shown in FIG. 15E. In this example, the use of the full power bar 1502 has not used up any player moves, however, in some embodiments, the use of the full power bar 1502 may use one or more moves the player is allowed for the level.

In some embodiments, when the power bar 1502 is full, the user may be presented with an additional booster which he can use. The user may be able to choose the placement location of the booster on the gameboard, or it may be placed randomly at a tile location on the gameboard. In some embodiments, the booster may only be placed at a tile location which does not currently contain a booster. It may also be prevented from being placed at the location of a blocker element, or any other kind of special element. For example, in some embodiments, the booster may only be placed at a tile location which is currently occupied by a candy. The user may be presented with the additional booster instead of or as well as activating the power bar to remove all of one type of element from the gameboard 100.

The final game mode option displayed to the user on the pre-level screen 300 shown in FIG. 7 is the 'Regular' game mode option. This game mode option does not alter the rules of the level.

In the example pre-level screen of FIG. 7, the 'Regular' game mode option is shown to be visually similar to the options for the runes which result in rule modifications. In some embodiments, the 'regular' or 'normal' game play button may be visually different from the user selectable elements associated with the rule modifying runes. For example, the 'normal play' button may be larger than the rune buttons, it may be a different shape and/or it may have a different symbol associated with it such that it is easily distinguishable from the user selectable buttons for the rune rule modifications.

In some embodiments, the visually distinguishable button described above may be used to indicate the user's desire to continue playing in the selected game mode option. For example, if the user is not required to select the game mode option in which he wishes to play the level before every level, such that the game mode option remains selected when a user finishes a level attempt and the same rule modifications are applied to the next level the user attempts, the user may select the distinguishable play button to continue on to the next level and play the level with the previously selected game mode option.

Once the user has completed a level by achieving the goals associated with the level, he may proceed to play the next level in the sequence. Alternatively, he may choose to replay the level which he has just completed, or any other level he has completed in the past. He may choose to replay a level using a different rune, so applying different rule modifications to the level rules. In some embodiments, the user may receive a reward for completing a single level in a predefined number of different game mode options. The user may receive more significant or valuable rewards for completing the level in a larger number of different game mode options.

The method described above may be implemented in games with alternative game mechanics. For example, Blossom Blast Saga has a linker game mechanic. In this game, the game elements are visually represented as flowers. The user aims to remove flowers from the gameboard by linking groups of 3 or more matching flowers. The user can select the flowers to link by, for example, dragging his finger over the flowers and then releasing his finger to select the linked flower. Alternatively, the user may click on the flowers he wishes to link and then actively select a completion button to trigger his selection. When the selection of the linked flowers has been triggered, the game logic checks to see if the selected flowers are involved in a match condition. That is, the game logic accesses a tile database storing tile data and checks the tile characteristics of the user selected linked tiles=. If the tile characteristics of the user linked tiles match, the game elements in the linked group are removed from the gameboard. When flowers are removed from the gameboard, the gameboard is refilled as described above. The levels of the game are presented to the user according to an order defined by the game. Levels are completed when a user achieves pre-defined goals associated with that level.

Figure 16:
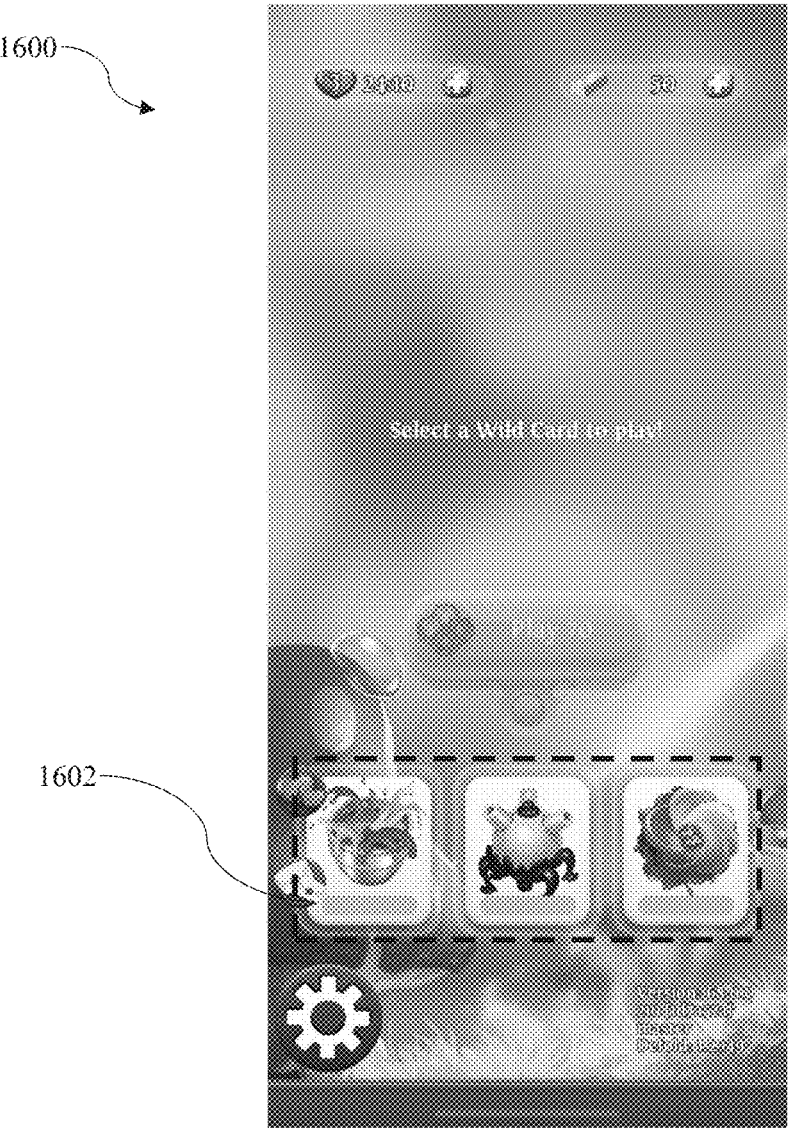
FIG. 16 shows an example pre-level screen from which the user can select a RightOps card to implement in the level.
Figure 17:
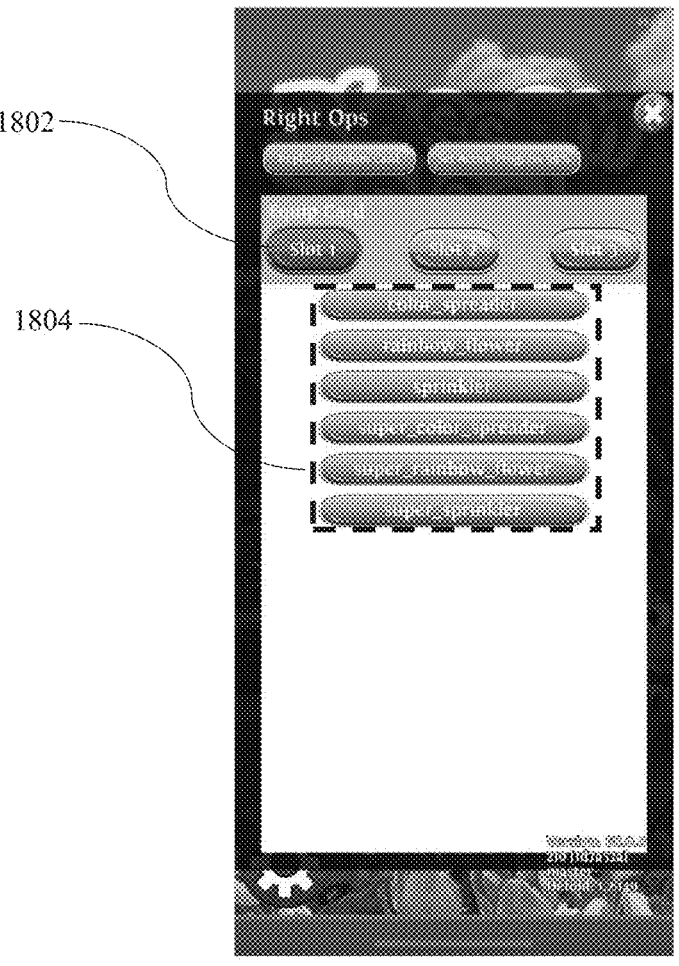
FIG. 17 shows an example of a display from which the user can select the RightOps cards for his card deck.

In Blossom Blast Saga, the user is presented with a card selection screen 1600, as shown in FIG. 16, when he selects a level to play. The user has a card deck 1602 containing three card slots. It will be appreciated that there may be more or fewer card slots in the card deck 1602. The card slots are filled with RightOps cards. The user may select which RightOps cards appear in the card deck 1602. The user may, for example, select which cards appear in his card deck 1602 via a main menu, such that the card deck 1602 is constant for all levels the user plays. Alternatively, the user may select the cards for his card deck 1602 in a pre-level screen. In this embodiment, the selected cards may remain constant for all levels even when the user plays a different level, or the cards may be specific to the level the user is about to play. An example card deck selection screen is shown in FIG. 17. The user may select a slot 1802 corresponding to one of the slots in his card deck 1602. He then selects one of the RightOps from the available RightOps list 1804 to fill the selected slot 1802 in his card deck 1602. He may have the option to change the cards in his card deck 1602. There may be a limit to the number of card changes he is allowed in a given time period. For example, the user may be allowed to switch one card in his deck 1602 for a different card every 24 hours. He may be able to make additional card switches by exchanging something in return for the card switch, for example, he may use gold bars which he has collected through game play to make an additional switch in the given time period. In an alternative embodiment, the cards in the card deck 1602 are not selected by the user, but instead selected automatically. This automatic selection may, for example, be a random selection, the cards may be selected in some pre-defined order, or the cards may be grouped into types of RightOps cards and cards are selected based on their type. The cards may be selected by the game logic.

The RightOps which are available to the user for placing in his card deck 1602, whether to be chosen by the user or selected by the game logic, may be stored in a reserve card deck. The available RightOps list 1804 is an example of a user accessible reserve card deck. These available RightOps cards may be queued in a pre-defined order, such that when a RightOps card which the user holds in his deck 1602 is complete, it is replaced with the next RightOps card in the queue. Alternatively, the user may be able to select the next card to occupy his card deck 1502 from the reserve card deck upon completion of a card. The completion of cards is described below.

The RightOps cards are each associated with different game rule modifications, in a similar manner to the runes described above. These cards and associated rule modifications may be stored in a mode database 306, and applied to the game level as described above with reference to FIGS. 7 and 8. In some embodiments, each card is associated with both a positive and a negative modification. For example, the rule modification associated with the card may increase the area of the gameboard affected by a booster, but also decrease the time in which the user has to complete the game level. Another example of the rule modifications associated with a RightOps card may be to reduce the number of elements required in a match to generate a booster, but also to reduce the number of moves the player is allowed to make in order to successfully complete the level.

Figure 18:
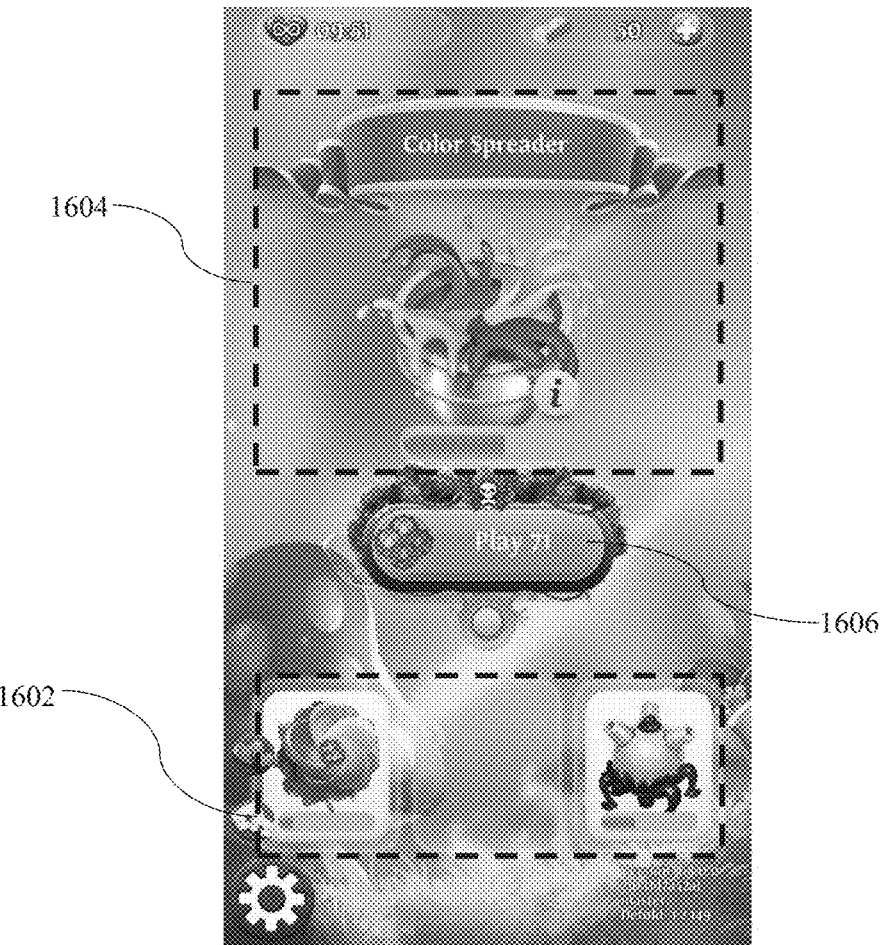
FIG. 18 shows an example pre-level screen after the user has selected a RightOps card.

The user selects one of the RightOps cards from his card deck 1602 to implement in the selected game level. The selected card may be indicated in some way. For example, the selected card may be enlarged in the card deck 1602, there may be a coloured border shown around the card, the selected card may be highlighted while the other cards in the deck 1602 are dimmed, or the selected card may be removed from the card deck 1602 and shown as an enlarged card 1604 above the card deck 1602 as shown in FIG. 18. The enlarged card 1604 may comprise one or more of the name of the card, an icon associated with the selected RightOps card, a progression bar indicating the user's progression through any goals associated with the card, and a description of the effect of the selected card. The information associated with the selected RightOps card may be presented to the user on the display, or the user may be able to access the information by selecting an information icon button. Allowing the user to see a description of the effects of the selected card prior to confirming his selection allows him to more strategically choose which RightOps card modifications to implement in the level. Once the user is happy with his RightOps card selection, he selects the play button 1606 to confirm his selection and proceeds to the gameplay display.

Figure 19:
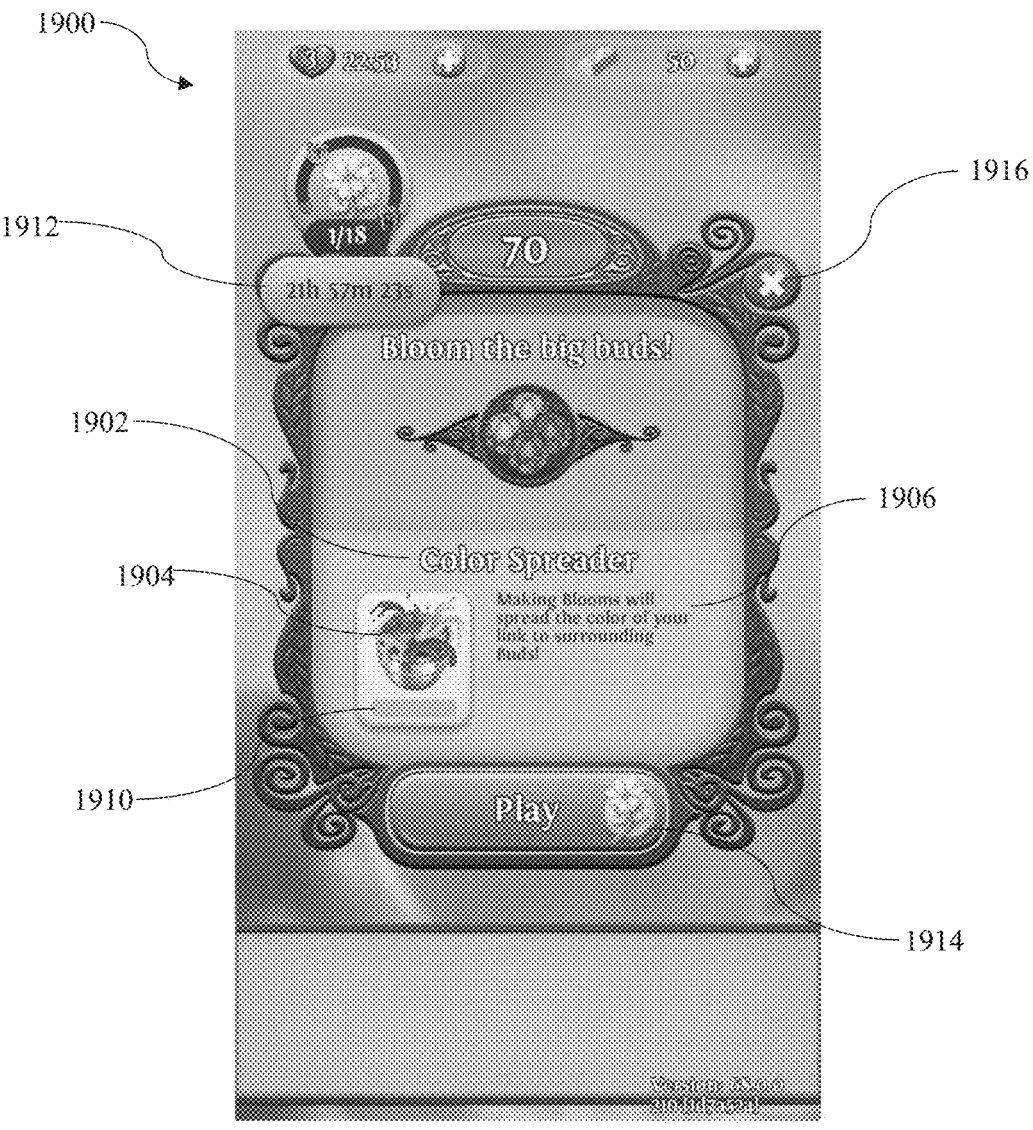
FIG. 19 shows an example pre-level screen displaying information about the user selected RightOps card.

In some embodiments, after the user selects the play button 1606 he is taken to a card description display 1900, as shown in FIG. 19. Here, the user may be presented with information regarding the selected card. For example, the name 1902 of the card and the icon 1904 associated with the card are displayed. A description of the effects 1906 of the card is also displayed to the user. In some embodiments, RightOps cards are associated with goals which the user must achieve in order to complete the RightOps card. The goals associated with the card may be displayed to the user on the card description display 1900, although not shown in FIG. 19. A RightOps goal progression bar 1910 indicates the user's progression towards completing the goals. The reward the user would receive if he achieves the goal, which is also not shown in FIG. 19, may also be displayed on the card description display 1900. A timer 1912 may be displayed, indicating the remaining time for the user to complete the goals associated with the selected RightOps card or the time remaining until the RightOps card expires. If the user decides to play the level using the selected RightOps card, he can confirm his selection and proceed to the gameplay display by selecting the play button 1914. He may choose to return to the card selection display to select an alternative RightOps card to use to play the level by selecting the exit button 1906.

In some embodiments, the user may be able to select more than one RightOps card to implement in a single level. The user may be able to play the level without implementing a RightOps card, such that the level rules remain unmodified.

In some embodiments, some RightOps cards may be limited to use in certain levels. For example, the user may not be able to use one or more of the cards in his deck 1602 when playing the selected level.

The player may be presented with tutorial information when he starts the level. Tutorial information may be available to the user at any time, for example by clicking on an icon indicating the RightOps card in play during gameplay.

If the user completes a level using a RightOps card, he may be awarded additional rewards. For example, the user may be awarded additional boosters, new RightOps, or an amount of a currency such as gold bars.

Upon completion of a level, the user may be presented with the options of replaying the level, continuing to the next level, or playing a previous level. The cards in the user's card deck 1602 may remain constant or they may be changed, either by the user or automatically. The selected card 1604 may also stay selected, or the user may be required to select a card to implement before playing the next level he wishes to play.

If the user fails to complete the level, he may have the option to retry the level using the same RightOps card. Alternatively, he may choose to change the RightOps card he is using. A different RightOps card may modify the rules of the level such that it is easier for the player to complete the level. The player may also choose to change levels. In some embodiments, if the user chooses to change the RightOps card in play, he may lose any progression he has made in that card.

In some embodiments, the RightOps cards are associated with goals. These goals may be additional to the goals associated with the level the user is playing. The user may be required to complete the goals associated with the RightOps card as well as the goals associated with the level in order to complete the level. Alternatively, the user may only need to complete the goals associated with the level to complete the level, and the completion of the goals associated with the RightOps card is an additional goal which may be rewarded separately if completed. The user may be able to complete the goals associated with the RightOps card over more than one level. He may, for example, have a predefined time period in which to achieve the goals and complete the RightOps card, or he may have to achieve the goals of the RightOps card within a predefined number of level attempts or completed levels.

In other embodiments, RightOps cards are not associated with goals for the user to achieve. RightOps cards may become complete when the user has used the card for a predefined number of level attempts or completed levels, or the card has been in his card deck 1602 for a predefined period of time. In some embodiments, RightOps card may only be used once before they are removed from the user's card deck 1602.

Once a RightOps card has been completed, it may be removed from the user's card deck 1602. It may also be removed from the user's reserve card deck. Alternatively, it may be placed back into the reserve card deck for placement in the user's card deck 1602 at another time. The RightOps cards stored in the user's reserve card deck may be able to be used or completed a predefined number of times before they are removed from the reserve card deck.

Figure 20:
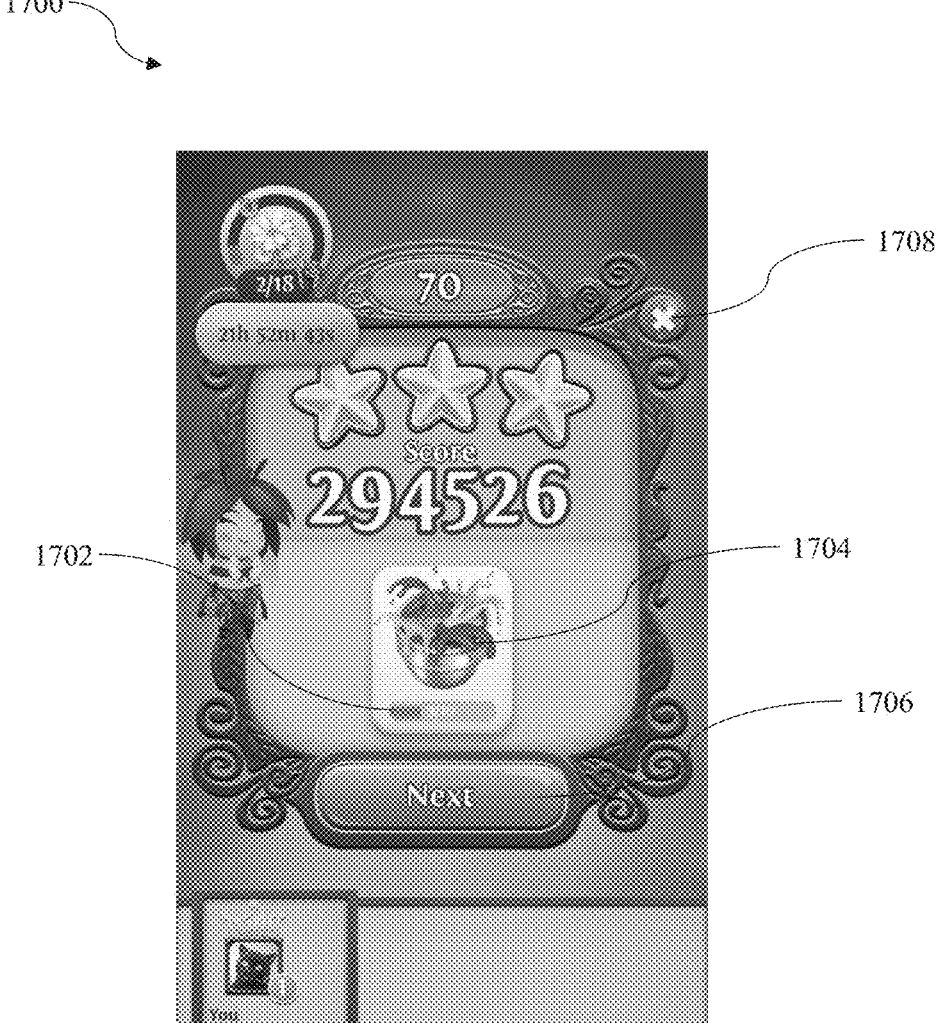
FIG. 20 shows a post-level screen displayed after the user has played a level in which a RightOps was implemented.

FIG. 20 shows an example of a post-level screen 1700 displayed to the user when he completes a level. Below the RightOps indicator 1704, there is a progression bar 1702. This indicates the user's progress towards completing the RightOps, such that the bar becomes fuller as the user collects more points or completes more required objectives contributing to his completion of the RightOps goal. If the user chooses to replace a RightOps card in his card deck 1602 which he has been using, he may lose the progression he has made towards the goals associated with the RightOps card. The user may, in some embodiments, lose the progression he has made on a card if he loses all of his lives. Lives may be lost if the user fails to complete the goals in the pre-defined time or if he quits a level without completing it. The user may proceed to the next level using the same selected card by selecting the next button 1706. Alternatively, he may choose to change the selected card by selecting the exit button 1708 which takes him to the card selection display 1600.

The user may unlock additional RightOps cards through gameplay. For example, if he achieves pre-defined goals, he may be awarded one or more RightOps cards. Alternatively or additionally, the player may unlock RightOps cards based on his ranking. For example, if he is ranked top out of the friends he has connected with via social media, or in a top pre-defined percentile of all players, additional RightOps cards may be unlocked. The additional RightOps cards unlocked by the user may be stored in the reserve card deck.

Figure 21:
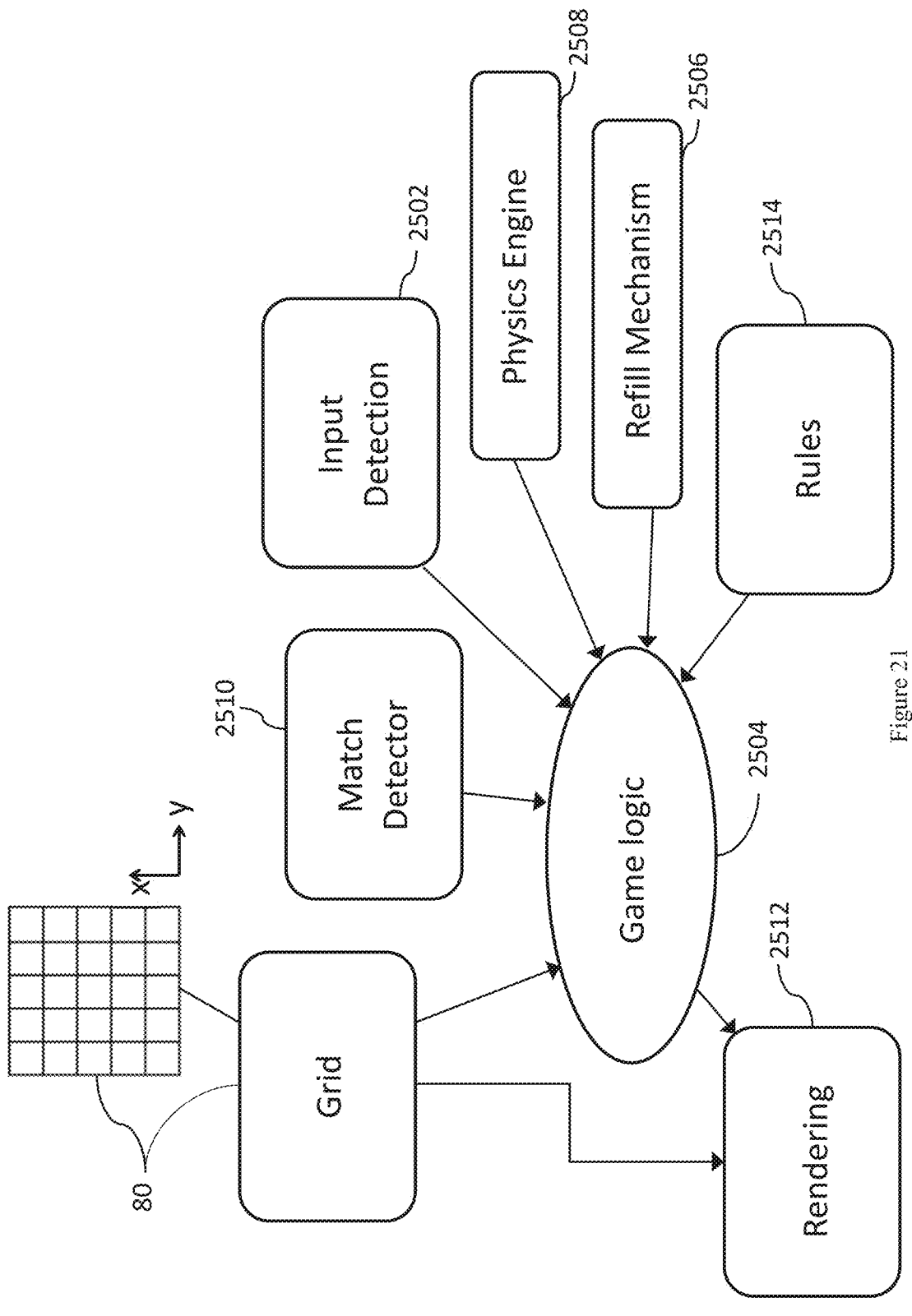
FIG. 21 shows a view of the functional components of the game.

FIG. 21 shows a schematic representation of the functional blocks of an embodiment of the present invention used to enable game play, such as that discussed above. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be switched and checked for adjacent matching blocks. The game logic 2504 will process the information provided by the user input. The game logic 2504 may then determine if a valid selection has been made, and what the outcomes of the selection should be.

The user input is also detected in the Saga Map 200 display and the pre-level display 300. Here, the user selects level 352 which he wishes to play and the game mode option 304 he wishes to play the level in respectively. These selections determine the grid 80 and the rules implemented by a rules module 2514. The rules implemented by the rules module 2514 are modified using the mode data 312 retrieved from the mode database 360.

The rendering block is used to render the gameboard 100 to the user. It also renders the Saga Map 200 and the pre-level display 300 on the display of the client device 240.

The grid component 80 stored in a memory provides a grid representation of the game board as shown schematically in FIG. 21. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. a match detector component 2510, and a refill mechanism component 2506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function.

The game logic 2504 will determine the blocks selected by a user, and the actions to follow to implement the game mechanic.

Thus, the game logic controls the rules for determining if a valid group has been selected. The game logic 2504 operates according to the set of rules of the level the user is playing when he is playing in the 'Regular' game mode option, or the set of modified rules for the level associated with the user elected rune. The game logic will have access to data for each tile including its tile ID designating its location on the grid 80, and associated tile data providing information about the contents of that tile, e.g. the game element within that tile or at least one characteristic associated with the game element within the tile. The game logic 2504 will thus be able to determine the game elements to be removed from those respective tiles for each user selection. The grid can be considered as a map which may be used to determining the relative positions of tiles on the game board from the tile ID. In embodiments of the present invention, the grid 80 is implemented as a two-dimensional grid. By splitting the grid 80 into row or column sets of tiles, each with their own deterministic game element generating algorithm, the game board may be simplified to a set of one-dimensional sub-grids. The grid 80 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the endpoint of a game element moving due to a refill).

Once a group of matching adjacent blocks has been successfully created, these blocks may be removed, and the respective tiles will become empty. At this stage, a refill of the empty tiles is required based on the refill mechanism 2506. The refill mechanism 2506 may also have conditions on which it relies. For example, other moves or actions taking place on the gameboard may have to be completed before the refill mechanism can take place.

Each tile of the grid 80 may be associated with data to indicate a status, such as filled or unfilled (empty). Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of the physics engine 2508, or as the endpoint of a new block entering the game board. The physics engine component 2508 is configured to control the movement of moving game elements in the display. The physics engine 2508 may be part of the game logic 2504.

A filled tile will be treated by the game logic as a solid entity, preventing any other game objects from passing through this particular tile. By filled tile it is meant that the tile is occupied by a game element, e.g. a block, a booster etc. In this way, the game logic may also force the refill mechanism to conform to certain refill trajectories or paths. That is to say new or moving game elements will not be able to pass through or refill through filled tiles. It should be appreciated that the terms pass through and refill through are dependent on the specific game rules, e.g. some game boards may refill from a direction perpendicular to the plane of the game board.

It will be appreciated that, whilst specific embodiments of the invention have been described, these are not exhaustive. The scope of the invention is not defined by the described embodiment but only by the appendant claims.

The invention claimed is:

1. A computer device having:

a user interface configured to present to a user a level selection screen comprising a plurality of game levels, each game level comprising a plurality of tiles in a tile layout, each tile having an associated game attribute defined by the game level, and at least some of the tiles having displayed thereon user actuatable game elements with which the user can interact, the user interface being configured to detect selection of a selected one of the plurality of game levels;

wherein each of the plurality of game levels is associated with a set of rules which control the display of game outcomes on the user interface, the set of rules subject to modification for generating modified versions of each game level;

a level database which stores a plurality of tile layouts and associated game attributes of the respective plurality of game levels;

a processor configured to receive the selection of the selected one of the plurality of game levels;

access the level database to obtain one of the tile layouts and associated game attributes of the tiles of the selected game level;

after receiving the selection of the selected game level via the level selection screen and prior to presenting the selected game level on the user interface, present a pre-level screen to a user on the user interface the pre-level screen comprising a plurality of selectable objects each selectable object associated with a set of rule modifications, each set of rule modifications providing a game mode option for the user to play that game level, wherein each game level is playable in a selectable one of multiple game mode options;

detect selection of a first selectable object of the plurality of selectable objects of the pre-level screen prior to presenting the selected game level on the user interface;

access a set of rule modifications associated with the first selectable object of the pre-level screen prior to presenting the selected game level on the user interface for modifying the set of rules associated with that game level to generate a modified set of rules, without modifying the layout of tiles or game attributes of the tiles;

generate a modified version of the selected game level prior to presenting the selected game level on the user interface using the modified set of rules, and the unmodified tile layout and associated game attributes of the selected level; and cause the user interface to present the modified version of the selected game level to the user for interaction according to the modified set of rules, the user interface configured to detect user input when a user engages with at least one of said user actuatable game elements in the modified version of the selected game level.

2. A computer device according to claim 1, wherein the user actuatable game elements have different characteristics, and, when a match game condition is detected, matching game elements are removed and replaced by a random refill procedure.

3. A computer device according to claim 1, wherein the set of rules defines a number of game moves within which a game objective for the level is to be attained to be displayed as a game outcome.

4. A computer device according to claim 3, wherein the set of rule modifications defines a period of time, corresponding to the number of game moves, within which the objective is to be attained to be displayed as the game outcome.

5. A computer device according to claim 1, wherein the set of rule modifications provides a swap object, which when activated swaps the moves remaining for time remaining whilst in a game play display.

6. A computer device according to claim 2, wherein the set of rules presents to the user a power bar which displays as a game outcome a charge level based on consecutive matches.

7. A computer device according to claim 6, wherein the set of rule modifications causes the power bar to be charged only with consecutive matches of the same type, the power bar becoming full after a predefined number of consecutive matches of the same type.

8. A computer device according to claim 7, wherein when the power bar is full it is rendered as selectable by a user, and when selected, any game elements of a common type are removed from the game board.

9. A computer device according to claim 7, wherein the power bar is emptied after reaching a charge level after one or more matches of the same type prior to reaching said predefined number if a next match is of a different type of game elements.

10. A computer device according to claim 2, wherein the set of rule modifications causes a reserve user actuatable game element to be displayed to a user, said reserve game element being located outside the layout of tiles, wherein the user can select one of the user actuatable game elements on the layout and swap said selected user actuatable game element with the reserve game element to provide as a game outcome an altered gameboard.

11. A computer device according to claim 1, wherein the game level presented to the user according to the set of modified rules presents a user selectable shuffle option which rearranges the positions of the at least some user actuatable game elements on the layout to provide an altered game element arrangement as a game outcome.

12. A computer device according to claim 11, configured to enable the shuffle option for selection only every n game moves, wherein the set of rules defines a number of game moves within which an objective is to be attained.

13. A computer device according to claim 2, wherein the layout is an m by n array of rows and columns and the set of rules controls the operation of a special user actuatable game element, such that when the special game element is part of a match game condition, a game outcome is such that a row or column of game elements is removed from the board.

14. A computer device according to claim 13, wherein the set of rule modifications controls operation of the special user actuatable game element, such that, when the special user actuatable game element is part of a match game condition, it causes multiple rows or columns to be removed, and at least one column or row respectively.

15. A computer device according to claim 2, wherein the layout is an m by n array, and game elements are switchable in their row or column, a match game condition being detected when adjacent game elements arranged in rows or columns are of the same type.

16. A computer device according to claim 15, wherein the set of rule modifications enables diagonal switching of game elements of the gameboard.

17. A computer device according to claim 1, wherein the layout is an n by m array.

18. A computer device according to claim 17, wherein m=n.

19. A computer device according to claim 1, wherein the game attributes of the tiles comprise user actuatable game elements, blockers, and pre-designated special game elements.

20. A computer device according to claim 1, wherein the set of rules define at least one of: a switcher mechanic; clicker mechanic; and a linker mechanic.

21. A method comprising:

presenting to a user on a display of a user interface a level selection screen comprising a plurality of game levels, each game level comprising a plurality of tiles in a tile layout, each tile having an associated game attribute defined by the game level, and at least some of the tiles having displayed thereon user actuatable game elements with which the user can interact, wherein each of the plurality of game levels is associated with a set of rules which control the display of game outcomes, the set of rules subject to modification for generating modified versions of each game level;

receiving a selection of the selected one of the plurality of game levels;

accessing a level database which stores a plurality of tile layouts and associated game attributes of the respective plurality of game levels to obtain one of the tile layouts and associated game attributes of the tiles of the selected game level;

after receiving the selection of the selected game level via the level selection screen and prior to presenting the selected game level on the user interface, presenting a pre-level screen to a user on the user interface the pre-level screen comprising a plurality of selectable objects each selectable object associated with a set of rule modifications, each set of rule modifications providing a game mode option for the user to play that game level, wherein each game level is playable in a selectable one of multiple game mode options;

detecting selection of a first selectable object of the plurality of selectable objects of the pre-level screen prior to presenting the selected game level on the user interface;

accessing a set of rule modifications associated with the first selectable object of the pre-level screen prior to presenting the selected game level on the user interface for modifying the set of rules associated with that game level to generate a modified set of rules, without modifying the layout of tiles or game attributes of the tiles;

generating a modified version of the selected game level prior to presenting the selected game level on the user interface using the modified set of rules and the unmodified tile layout and associated game attributes of the selected level; and causing the user interface to present the modified version of the selected game level to the user for interaction according to the modified set of rules, the user interface configured to detect user input when a user engages with at least one of said user actuatable game elements in the modified version of the selected game level.

22. A computer program product comprising computer-executable code embodied on a non-transitory computer-readable storage medium configured so as when executed by one or more processing units to perform the method of presenting to a user on a display of a user interface a level selection screen comprising a plurality of game levels, each game level comprising a plurality of tiles in a tile layout, each tile having an associated game attribute defined by the game level, and at least some of the tiles having displayed thereon user actuatable game elements with which the user can interact, wherein each of the plurality of game levels is associated with a set of rules which control the display of game outcomes, the set of rules subject to modification for generating modified versions of each game level;

receiving a selection of the selected one of the plurality of game levels;

accessing a level database which stores a plurality of tile layouts and associated game attributes of the respective plurality of game levels to obtain one of the tile layouts and associated game attributes of the tiles of the selected game level;

after receiving the selection of the selected game level via the level selection screen and prior to presenting the selected game level on the user interface, presenting a pre-level screen to a user on the user interface the pre-level screen comprising a plurality of selectable objects each selectable object associated with a set of rule modifications, each set of rule modifications providing a game mode option for the user to play that game level, wherein each game level is playable in a selectable one of multiple game mode options;

detecting selection of a first selectable object of the plurality of selectable objects of the pre-level screen prior to presenting the selected game level on the user interface;

accessing a set of rule modifications associated with the first selectable object of the pre-level screen prior to presenting the selected game level on the user interface for modifying the set of rules associated with that game level to generate a modified set of rules, without modifying the layout of tiles or game attributes of the tiles;

generating a modified version of the selected game level prior to presenting the selected game level on the user interface using the modified set of rules and the unmodified tile layout and associated game attributes of the selected level; and causing the user interface to present the modified version of the selected game level to the user for interaction according to the modified set of rules, the user interface configured to detect user input when a user engages with at least one of said user actuatable game elements in the modified version of the selected game level.

* * * * *